(12) United States Patent
Muraoka et al.

(10) Patent No.: US 6,207,075 B1
(45) Date of Patent: Mar. 27, 2001

(54) LIQUID CRYSTAL COMPOSITION AND LIQUID CRYSTAL DISPLAY ELEMENT

(75) Inventors: Toshihiko Muraoka, Kumamoto; Katsuyuki Murashiro, Chiba; Fusayuki Takeshita, Chiba; Tetsuya Matsushita, Chiba; Etsuo Nakagawa, Chiba, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 08/981,651

(22) PCT Filed: Jan. 31, 1997

(86) PCT No.: PCT/JP97/00228

§ 371 Date: May 4, 1998

§ 102(e) Date: May 4, 1998

(87) PCT Pub. No.: WO97/32943

PCT Pub. Date: Sep. 12, 1997

(30) Foreign Application Priority Data

Mar. 7, 1996 (JP) .................................................. 8-080809

(51) Int. Cl.$^7$ ............................ C09K 19/30; C09K 19/12
(52) U.S. Cl. ................................ 252/299.63; 252/299.66
(58) Field of Search ........................... 252/299.63, 299.66

(56) References Cited

U.S. PATENT DOCUMENTS

| | | | |
|---|---|---|---|
| 4,877,548 | * 10/1989 | Kitano et al. | 252/299.63 |
| 4,880,562 | * 11/1989 | Kitano et al. | 252/299.63 |
| 5,183,587 | * 2/1993 | Kitano et al. | 252/299.63 |
| 5,328,642 | * 7/1994 | Rieger et al. | 252/299.63 |
| 5,364,556 | * 11/1994 | Schadt et al. | 252/299.01 |
| 5,403,512 | * 4/1995 | Bartmann et al. | 252/299.01 |
| 5,723,682 | * 3/1998 | Poetsch et al. | 568/655 |
| 5,837,162 | * 11/1998 | Reiffenrath et al. | 252/299.63 |

FOREIGN PATENT DOCUMENTS

| | | |
|---|---|---|
| 0325796 | 8/1989 | (EP) . |
| 0377469 | 7/1990 | (EP) . |
| 0481293 | 4/1992 | (EP) . |
| 0717093 | 6/1996 | (EP) . |
| WO91/19772 | 12/1991 | (WO) . |

* cited by examiner

Primary Examiner—C.H. Kelly
(74) Attorney, Agent, or Firm—Wenderoth, Lind & Ponack, L.L.P.

(57) ABSTRACT

A liquid crystal composition which has a superior voltage transmittance (sharpness) for good color and high-speed response characteristics. The composition contains at least one of the following first component (I-a, I-b), second component (II-a to II-d) and third component (III-a to III-c) respectively:

(I-a) $R^1$—[cyclohexyl]—[cyclohexyl]—$(CH_2)_{\overline{n}}$—CH=CF$_2$ (I-b) $R^1$—[cyclohexyl]—[cyclohexyl]—$(CH_2)_{\overline{n}}$—CH=CHF (II-a) $R^1$—[phenyl]—[cyclohexyl]—[cyclohexyl]—$(CH_2)_{\overline{n}}$—CH=CF$_2$ (II-b) $R^1$—[phenyl]—[cyclohexyl]—[cyclohexyl]—$(CH_2)_{\overline{n}}$—CH=CHF (II-c) $R^1$—[phenyl]—[phenyl]—[cyclohexyl]—$(CH_2)_{\overline{n}}$—CH=CF$_2$ (II-d) $R^1$—[phenyl]—[phenyl]—[cyclohexyl]—$(CH_2)_{\overline{n}}$—CH=CHF (III-a) $R^2$—([cyclohexyl])$_p$—($A^1$)—[phenyl]—CN (III-b) $R^2$—([cyclohexyl])$_q$—($A^2$)—$Z^0$—[phenyl]—CN (III-c) $R^2$—([cyclohexyl])$_m$—($A^3$)—$Z^1$—[phenyl(F)(CN)($Q^1$)]

wherein $R^1$, $R^2$, $Z^0$, $Z^1$, $Q^1$, $A^1$, $A^3$, p, q, m and n are defined in the specification.

12 Claims, No Drawings

LIQUID CRYSTAL COMPOSITION AND LIQUID CRYSTAL DISPLAY ELEMENT

DETAILED DESCRIPTION OF THE INVENTION

Field of the Invention

The present invention relates to a nematic liquid crystal composition containing at least one chiral additive arranged within a sealed cell formed of two substrates having transparent electrodes and a liquid crystal display element with use of the said liquid crystal composition.

In more detail, the invention relates to a liquid crystal composition suitable for a super twist birefringence (STN) mode and a liquid crystal display element with use of the said liquid crystal composition.

Description of Prior Art

There have been proposed and put to practical uses one after another a twist nematic (TN) mode, a super twist birefringence (STN) mode and an active matrix (AM-LCD) mode etc. Amongst there of, a super twist birefringence (STN) mode proposed by T. J. Scheffer et al. (Appl. Phy. Lett., 45 (10), 1021 (1984)) wherein alignments of liquid crystal molecules in the upper and lower substates are twisted at from 180 to 270° is adapted as LCD's for personal computers and word processors etc. and it becomes to be required more various improvements as to its characteristics.

The liquid crystal composition used for the liquid crystal display element of the said STN mode is required to have the following characteristics:

(1) a voltage-transmittance characteristic (a sharpness) being sharp in order to increase a contrast of the liquid crystal display element, (2) a phase transition temperature (a transparent point) being high in order to decrease a change in coloring due to a temperature dependency of a refractive anisotropy ($\Delta n$), and (3) a viscosity ($\eta$) being low in order to decrease a response time as possible.

Amongst these characteristics, in particular, correspondency to coloring and correspondency to animation are strongly required recently, and particularly improvements of the above-mentioned characteristics (1) and (3) become important.

However, even though such liquid crystal compositions have been zealously investigated, improvements have been always required under present conditions.

Problem to be Solved by the Invention

We inventors investigated various compositions with use of various liquid crystal compounds in order to solve these subjects, and found that the objects can be attained in the case of using a liquid crystal composition according to the present invention as a STN display element.

As clear from the above description, an object of the invention is to propose a liquid crystal composition which satisfies various characteristics required for the above-mentioned STN display mode and simultaneously has a superior voltage-transmittance characteristic (a sharpness) for corresponding to coloring and also a low viscosity for corresponding to a high-speed responce.

Means to Solve the Problem

The present invention is explained as follows.

(1) A liquid crystal composition characterized in that at least one compound expressed by the general formulae I-a and I-b

(I-a)

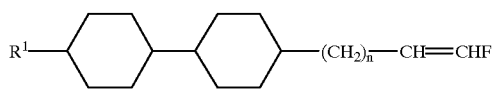

(I-b)

(wherein, $R^1$ denotes an alkyl group having from 1 to 10 carbon atom(s), optional one or non-adjacent two or more than two methylene group(s) (—$CH_2$—) in the above-mentioned groups may be substituted by (an) oxygen atom (s) (—O—) and —CH=CH— in all cases, and n denotes an integer of from 0 to 20.) is contained as the first component, at least one compound expressed by the general formulae II-a, II-b, II-c and II-d

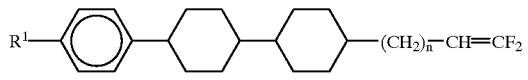

(II-a)

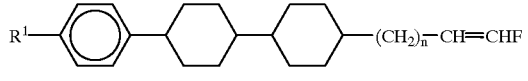

(II-b)

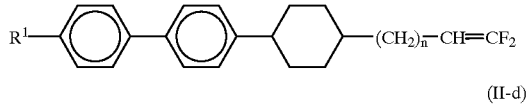

(II-c)

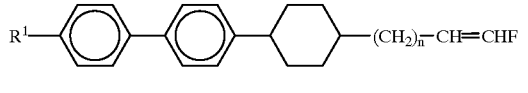

(II-d)

(wherein, $R^1$ denotes an alkyl group having from 1 to 10 carbon atom(s), optional one or non-adjacent two or more than two methylene group(s) (—$CH_2$—) in the above-mentioned groups may be substituted by (an) oxygen atom (s) (—O—) and —CH=CH— in all cases, and n denotes an integer of from 0 to 20.) is contained as the second component, and one or more than one compound(s) selected from the group of compounds expressed by the general formulae III-a, III-b and III-c

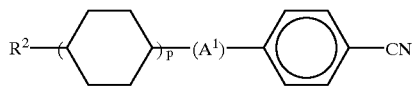

(III-a)

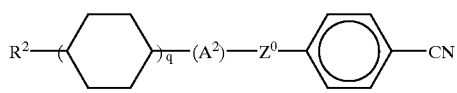

(III-b)

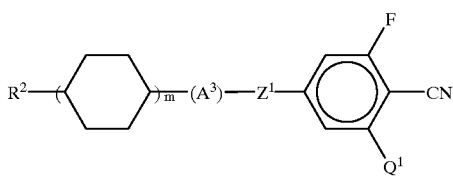

(wherein, $R^2$ denotes an alkyl group having from 1 to 10 carbon atom(s), optional one or non-adjacent two or more than two methylene group(s) (—$CH_2$—) in the above-mentioned groups may be substituted by (an) oxygen atom(s) (—O—) and —CH═CH— in all cases, $Z^0$ denotes —COO— or —$CH_2CH_2$—, $Z^1$ denotes —$C_2CH_2$—, —COO— or a single bond, $Q^1$ denotes H or F, $A^1$ denotes trans-1,4-cyclohexylene, 1,4-phenylene or 1,3-dioxane-2,5-diyl, $A^2$ and $A^3$ denote each independently trans-1,4-cyclohexylene or 1,4-phenylene, and p, q and m each independently denote 0 or 1.) is contained as the third component.

(2) A liquid crystal composition described in the above-mentioned item (1), characterized in that the first component is from 3 to 50% by weight, the second component is from 3 to 40% by weight and the third component is from 10 to 60% by weight, all based on the total weight of the liquid crystal composition.

(3) A liquid crystal composition characterized in that at least one compound expressed by the general formulae I-a and I-b

(I-a)

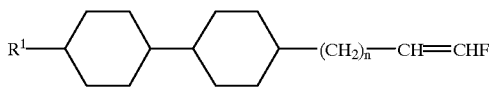
(I-b)

(wherein, $R^1$ denotes an alkyl group having from 1 to 10 carbon atom(s), optional one or non-adjacent two or more than two methylene group(s) (—$CH_2$—) in the above-mentioned groups may be substituted by (an) oxygen atom(s) (—O—) and —CH═CH— in all cases, and n denotes an integer of from 0 to 20.) is contained as the first component, at least one compound expressed by the general formulae II-a, II-b, II-c and II-d

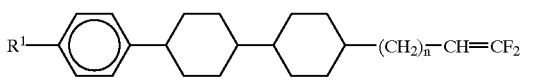
(II-a)

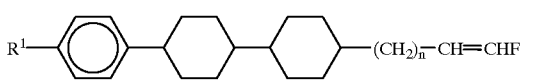
(II-b)

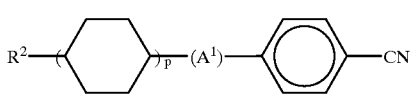
(II-c)

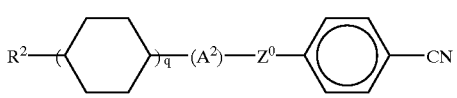
(II-d)

(wherein, $R^1$ denotes an alkyl group having from 1 to 10 carbon atom(s), optional one or non-adjacent two or more than two methylene group(s) (—$CH_2$—) in the above-mentioned groups may be substituted by (an) oxygen atom(s) (—O—) and —CH═CH— in all cases, and n denotes an integer of from 0 to 20.) is contained as the second component, one or more than one compound(s) selected from the group of compounds expressed by the general formulae III-a, III-b and III-c

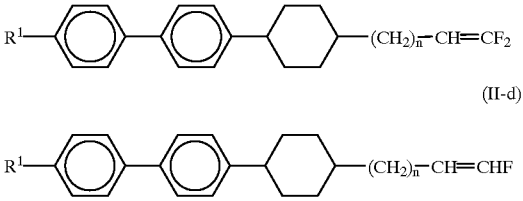

(wherein, $R^2$ denotes an alkyl group having from 1 to 10 carbon atom(s), optional one or non-adjacent two or more than two methylene group(s) (—$CH_2$—) in the above-mentioned groups may be substituted by (an) oxygen atom(s) (—O—) and —CH═CH— in all cases, $Z^0$ denotes —COO— or —$CH_2CH_2$—, $Z^1$ denotes —$CH_2CH_2$—, —COO— or a single bond, $Q^1$ denotes H or F, $A^1$ denotes trans-1,4-cyclohexylene, 1,4-phenylene or 1,3-dioxane-2,5-diyl, $A^2$ and $A^3$ denote each independently trans-1,4-cyclohexylene or 1,4-phenylene, and p, q and m each independently denote 0 or 1.) is contained as the third component, and at least one or more than one compound(s) selected from the group of compounds expressed by the general formulae IV and V, VI-a and VI-b

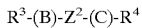
$R^3$-(B)-$Z^2$-(C)-$R^4$ (IV)

(wherein, $R^3$ and $R^4$ denote each independently an alkyl group having from 1 to 10 carbon atom(s), optional one or non-adjacent two or more than two methylene group(s) (—$CH_2$—) in the above-mentioned groups may be substituted by (an) oxygen atom(s) and —CH═CH— in all cases, B denotes trans-1,4-cyclohexylene, pyrimidine-2,5-diyl or 1,4-phenylene, C denotes trans-1,4-cyclohexylene or 1,4- phenylene, and $Z^2$ denotes —C≡C, —COO—, —CH$_2$CH$_2$—, —CH=CH—, —CF=CF— or a single bond.),

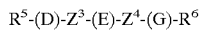 (V)

(wherein, $R^5$ denotes an alkyl group having from 1 to 10 carbon atom(s), optional one or non-adjacent two or more than two methylene group(s) (—CH$_2$—) in the above-mentioned groups may be substituted by (an) oxygen atom(s) (—O—) and —CH=CH— in all cases, $R^6$ denotes an alkyl group, an alkoxy group or an alkoxymethyl group having from 1 to 10 carbon atom(s), D denotes trans-1,4-cyclohexylene or pyrimidine-2,5-diyl, E denotes trans-1,4-cyclohexylene or 1,4-phenylene in which one H at a branched position may be optionally substituted with F, G denotes trans-1,4-cyclohexylene or 1,4-phenylene, $Z^3$ denotes —CH$_2$CH$_2$— or a single bond, and $Z^4$ denotes —C≡C—, —COO— or —CH=C— or a single bond.),

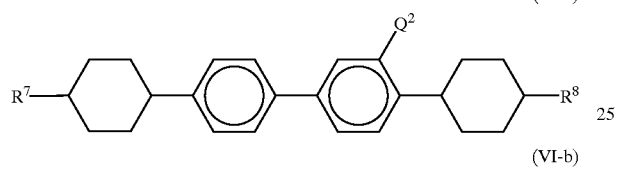

(VI-a)

(VI-b)

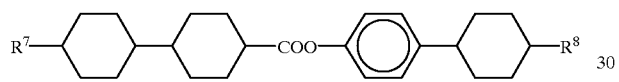

(wherein, $R^7$ denotes an alkyl group having from 1 to 10 carbon atom(s), optional one or non-adjacent two or more than two methylene group(s) (—CH$_2$—) in the above-mentioned groups may be substituted by (an) oxygen atom(s) (—O—) and —CH=CH— in all cases, $R^8$ denotes an alkyl group, an alkoxy group or an alkoxymethyl group having from 1 to 10 carbon atom(s), and $Q^2$ denotes H or F.) is contained as the fourth component.

(4) A liquid crystal composition described in the above-mentioned item (3), characterized in that the first component is from 3 to 50% by weight, the second component is from 3 to 40% by weight, the third component is from 10 to 60% by weight, and the fourth component is from 1 to 60% by weight, all based on the total weight of the liquid crystal composition.

(5) A liquid crystal composition characterized in that at least one compound expressed by the general formulae I-a and I-b (I-a)

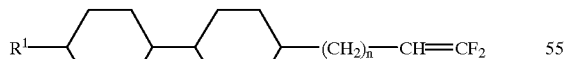

(I-b)

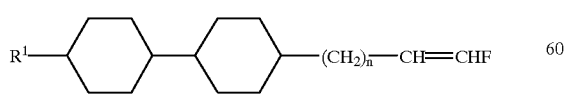

(wherein, $R^1$ denotes an alkyl group having from 1 to 10 carbon atom(s), optional one or non-adjacent two or more than two methylene group(s) (—CH$_2$—) in the above-mentioned groups may be substituted by (an) oxygen atom(s) (—O—) and —CH=CH— in all cases, and n denotes an integer of from 0 to 20.) is contained as the first component, at least one compound expressed by the general formulae II-a, II-b, II-c and II-d (II-a)

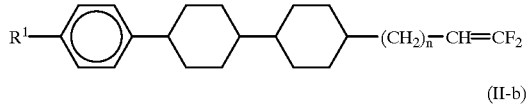

(II-b)

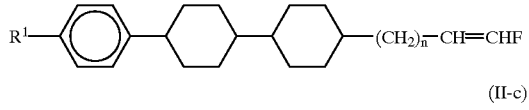

(II-c)

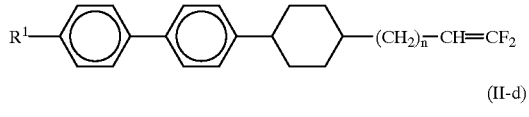

(II-d)

(wherein, $R^1$ denotes an alkyl group having from 1 to 10 carbon atom(s), optional one or non-adjacent two or more than two methylene group(s) (—CH$_2$—) in the above-mentioned groups may be substituted by (an) oxygen atom(s) (—O—) and —CH=CH— in all cases, and n denotes an integer of from 0 to 20.) is contained as the second component, one or more than one compound(s) selected from the group of compounds expressed by the general formulae III-a, III-b and III-c (III-a)

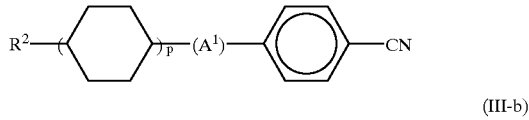

(III-b)

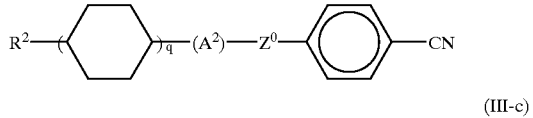

(III-c)

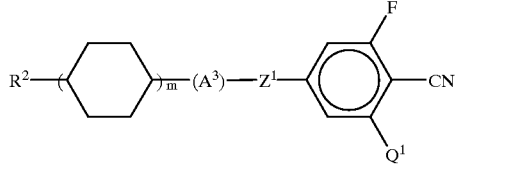

(wherein, $R^2$ denotes an alkyl group having from 1 to 10 carbon atom(s), optional one or non-adjacent two or more than two methylene group(s) (—CH$_2$—) in the above-mentioned groups may be substituted by (an) oxygen atom(s) (—O—) and —CH=CH— in all cases, $Z^0$ denotes —COO— or —CH$_2$CH$_2$—, $Z^1$ denotes —CH$_2$CH$_2$—, —COO— or a single bond, $Q^1$ denotes H or F, $A^1$ denotes trans-1,4-cyclohexylene, 1,4-phenylene or 1,3-dioxane-2,5-diyl, $A^2$ and $A^3$ denote each independently trans-1,4-cyclohexylene or 1,4-phenylene, and p, q and m each independently denote 0 or 1.) is contained as the third component, at least one or more than one compound(s) selected from the group of compounds expressed by the general formulae IV and V, VI-a and VI-b

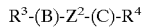  (IV)

(wherein, $R^3$ and $R^4$ denote each independently an alkyl group having from 1 to 10 carbon atom(s), optional one or non-adjacent two or more than two methylene group(s) (—$CH_2$—) in the above-mentioned groups may be substituted by (an) oxygen atom(s) and —CH=CH— in all cases, B denotes trans-1,4-cyclohexylene, pyrimidine-2,5-diyl or 1,4-phenylene, C denotes trans-1,4-cyclohexylene or 1,4-phenylene, and $Z^2$ denotes —C≡C—, —COO—, —$CH_2CH_2$—, —CH=CH—, —CF=CF— or a single bond.),

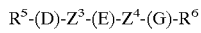  (V)

(wherein, $R^5$ denotes an alkyl group having from 1 to 10 carbon atom(s), optional one or non-adjacent two or more than two methylene group(s) (—$CH_2$—) in the above-mentioned groups may be substituted by (an) oxygen atom(s) (—O—) and —CH=CH— in all cases, $R^6$ denotes an alkyl group, an alkoxy group or an alkoxymethyl group having from 1 to 10 carbon atom(s), D denotes trans-1,4-cyclohexylene or pyrimidine-2,5-diyl, E denotes trans-1,4-cyclohexylene or 1,4-phenylene in which one H at a branched position may be optionally substituted with F, G denotes trans-1,4-cyclohexylene or 1,4-phenylene, $Z^3$ denotes —$CH_2CH_2$— or a single bond, and $Z^4$ denotes —C≡C—, —COO— or —CH=CH— or a single bond.),

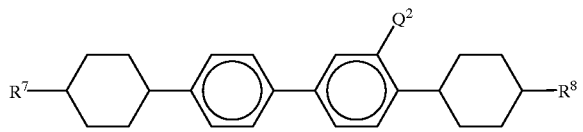

(VI-a)

(VI-b)

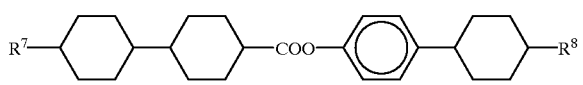

(wherein, $R^7$ denotes an alkyl group having from 1 to 10 carbon atom(s), optional one or non-adjacent two or more than two methylene group(s) (—$CH_2$—) in the above-mentioned groups may be substituted by (an) oxygen atom(s) (—O—) and —CH=CH— in all cases, $R^8$ denotes an alkyl group, an alkoxy group or an alkoxymethyl group having from 1 to 10 carbon atom(s), and $Q^2$ denotes H or F.) is contained as the fourth component, and at least one or more than one compound(s) selected from the group consisting of compounds expressed by the general formulae VII and VIII

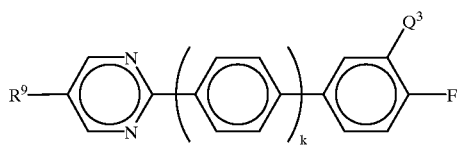  (VII)

(wherein, $R^9$ denotes an alkyl group having from 1 to 10 carbon atom(s), $Q^3$ denotes H or F, and k denotes 0 or 1),

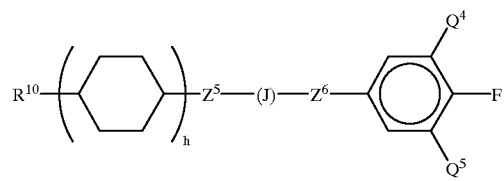  (VIII)

(wherein, $R^{10}$ denotes an alkyl group having from 1 to 10 carbon atom(s), J denotes trans-1,4-cyclohexylene or 1,4-phenylene, $Q^4$ and $Q^5$ denote each independently H or F, $Z^5$ and $Z^6$ denote each independently —COO— or a single bond, and h denotes 0, 1 or 2.) as the fifth component.

(6) A liquid crystal composition described in the above-mentioned item (5), characterized in that the first component is from 3 to 50% by weight, the second component is from 3 to 40% by weight, the third component is from 10 to 60% by weight, the fourth component is from 1 to 60% by weight, and the fifth component is from 1 to 50% by weight, all based on the total weight of the liquid crystal composition.

(7) A liquid crystal display element comprising a liquid crystal composition described in any of the above-mentioned items (1) to (6).

The liquid crystal compounds constituting the liquid crystal compositions according to the invention are explained as follows.

There may be preferably mentioned the following compounds as the compoundes expressed by the general formula I according to the invention.

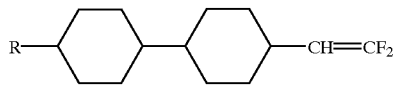  (I-a-1)

  (I-a-2)

  (I-a-3)

  (I-a-4)

-continued (I-b-1)
(I-b-2)
(I-b-3)
(I-b-4)

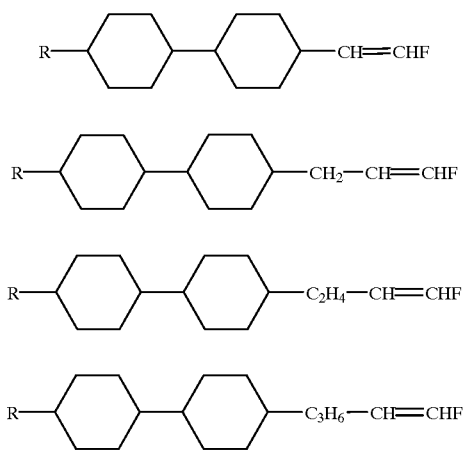

(wherein, R denotes an alkyl group.)

These compounds are known from Toku-Kai-Hei 1-175947 official gazette, Toku-Kai-Hei 1-308239 official gazette (EP0325796B) and Toku-Kai-Hei 2-184642 official gazette (EP377469B1). These compounds are those with weak positive dielectric anisotropies, and they are used for purposes to lower a viscosity and improve a sharpness.

As the compounds expressed by the general formulae II-a, II-b, II-c and II-d for the second component according to the invention, the followings may be mentioned with structural formulae of the preferable compounds and phase transition points of the typical compounds.

(II-a-1)

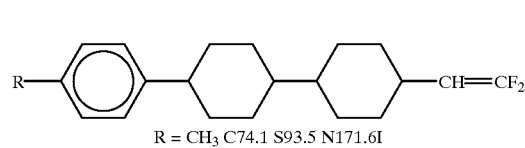

R = CH$_3$ C74.1 S93.5 N171.6I (II-a-2)

(II-a-3)

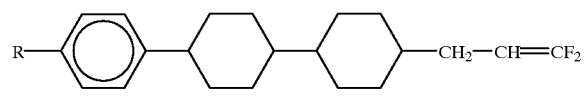

R = CH$_3$ C37.4 S115.6 N166.0I (II-a-4)

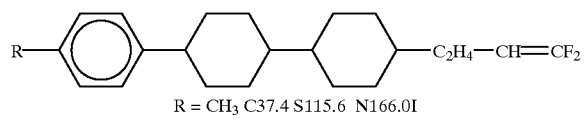

(II-b-1)

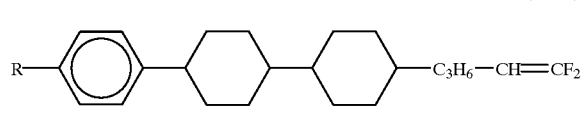

(II-b-2)
(II-b-3)
(II-b-4)

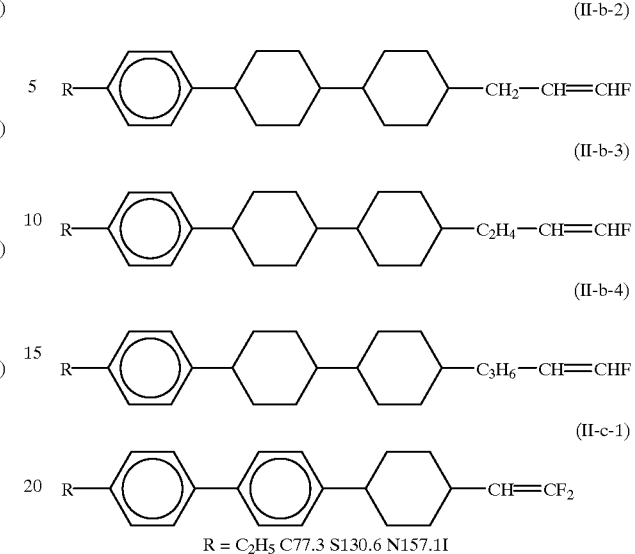

(II-c-1)

R = C$_2$H$_5$ C77.3 S130.6 N157.1I (II-c-2)
(II-c-3)
(II-c-4)

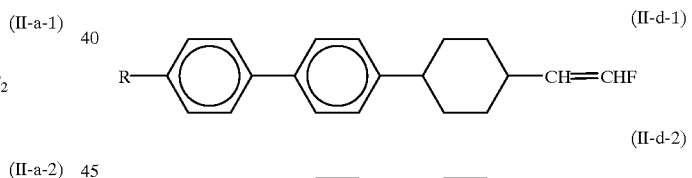

(II-d-1)
(II-d-2)
(II-d-3)
(II-d-4)

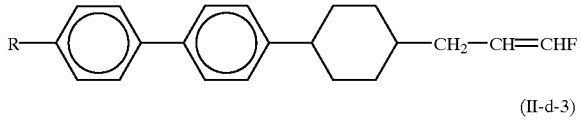
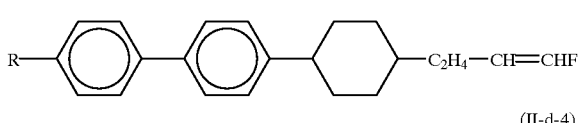
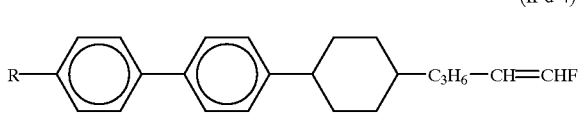

(wherein, R denotes an alkyl group.)

These compounds are those with weak positive dielectric anisotropies and large refractive anisotropies (Δn) such as Δn>0.1, and they are used mainly for a purpose to enlarge a nematic range or for purposes to lower a viscosity and improve a sharpness.

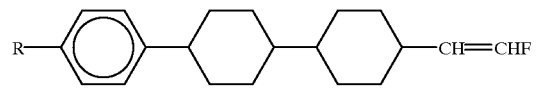

As the compounds expressed by the general formulae III-a, III-b and III-c for the third component according to the invention, the following compounds may be preferably mentioned.
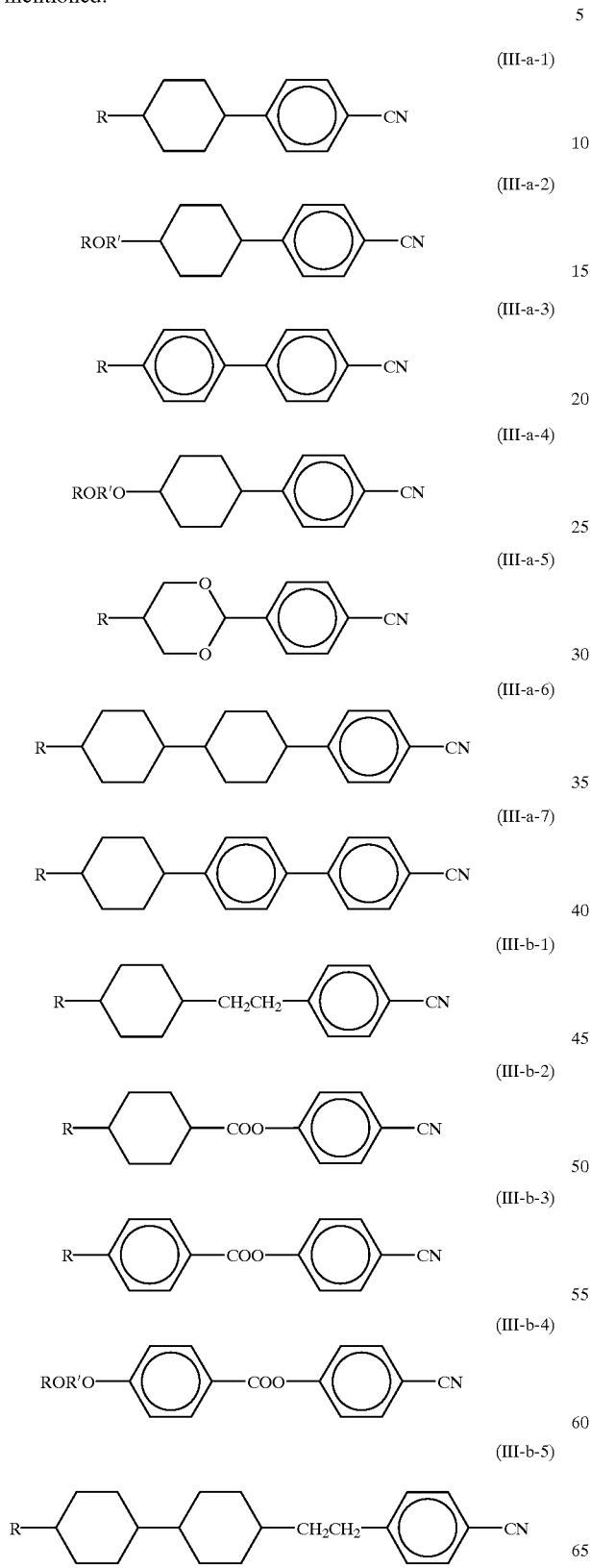
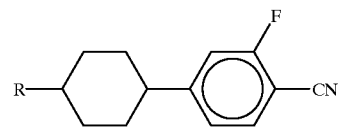
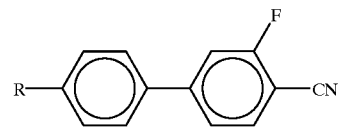
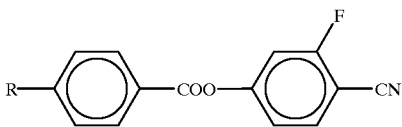
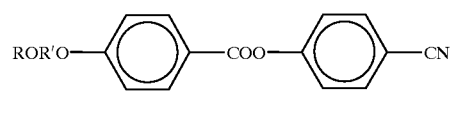
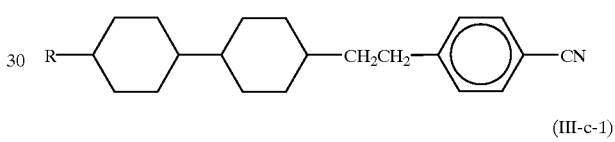
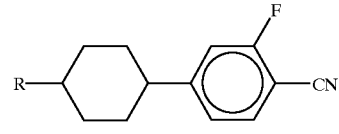
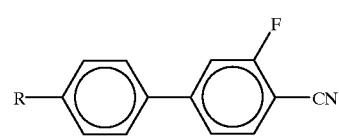
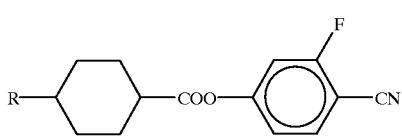
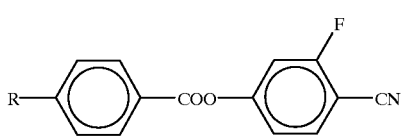
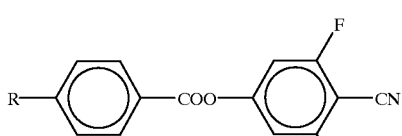

-continued

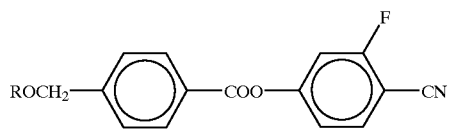
(III-c-6)

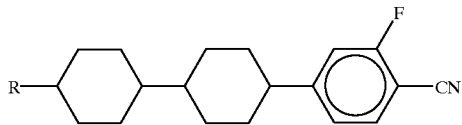
(III-c-7)

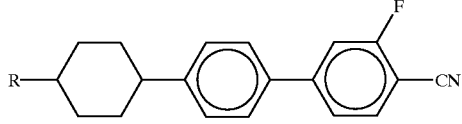
(III-c-8)

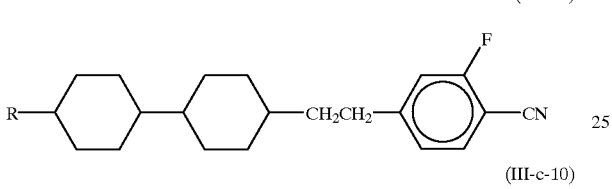
(III-c-9)

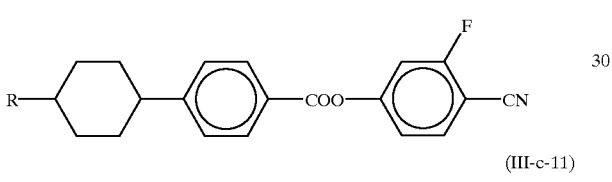
(III-c-10)

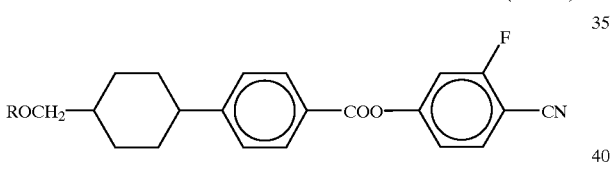
(III-c-11)

(wherein, R denotes an alkyl group. Furthermore, optional one or non-adjacent two or more than two methylene group(s) (—CH$_2$—) in the above-mentioned groups may be substituted by —CH=CH—.)

Amongst these compounds, in particular, compounds expressed by the formulae (III-a-1), (III-a-3), (III-a-6), (III-a-7), (III-b-1), (III-b-3), (III-b-5), (III-c-1), (III-c-4), (III-c-5), (III-c-6), (III-c-7), (III-c-10) or (III-c-11) are preferably used.

These compounds for the third component are those with positive dielectric anisotropies of large values, and they are used mainly for a purpose to lower a threshold voltage and a purpose to improve a sharpness which is important as a STN characteristic.

As the compounds expressed by the general formulae IV and V, VI-a, VI-b for the fourth component according to the invention, the following compounds may be preferably mentioned.

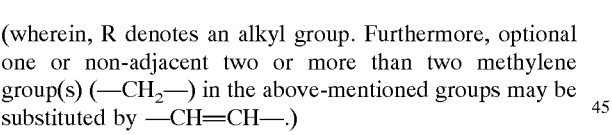
(IV-1)

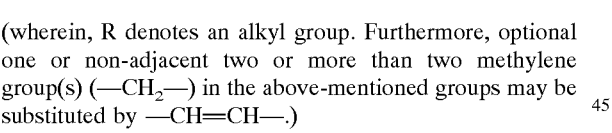
(IV-2)

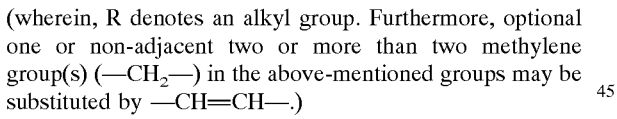
(IV-3)

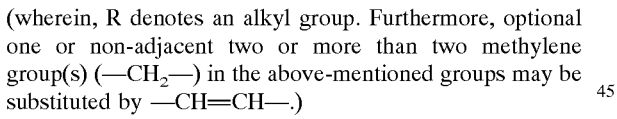
(IV-4)

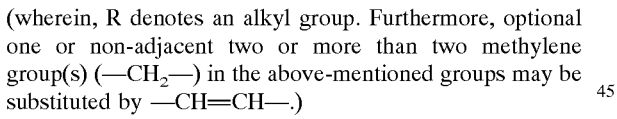
(IV-5)

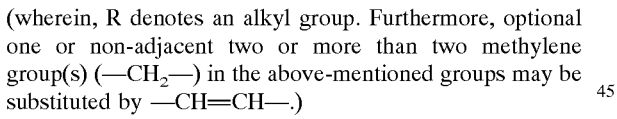
(IV-6)

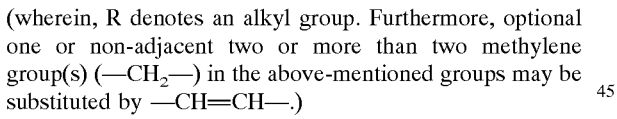
(IV-7)

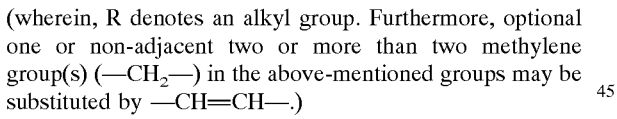
(IV-8)

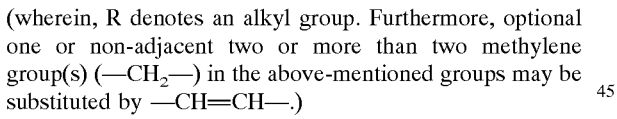
(IV-9)

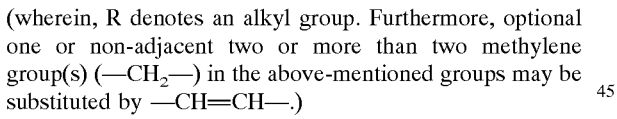
(IV-10)

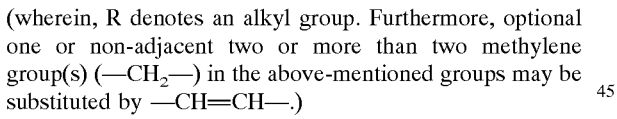
(IV-11)

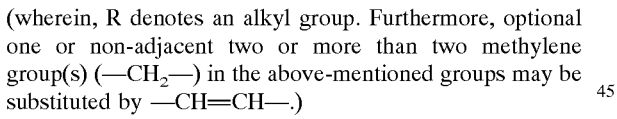
(IV-12)

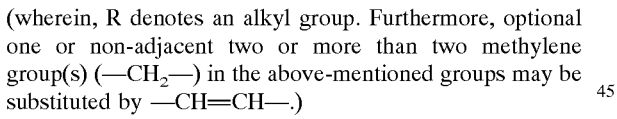
(IV-13)

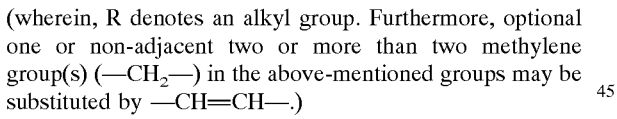
(IV-14)

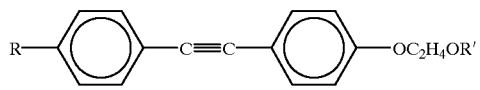 (IV-15)
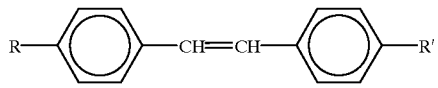 (IV-16)
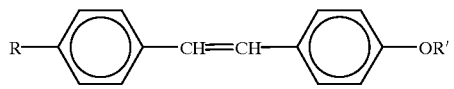 (IV-17)
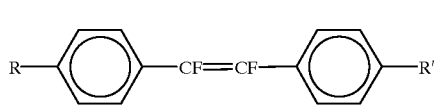 (IV-18)
 (IV-19)
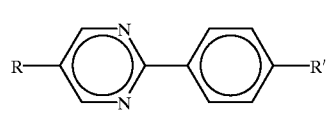 (IV-20)
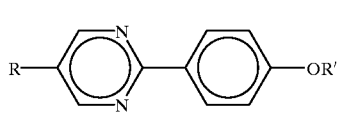 (IV-21)
 (V-1)
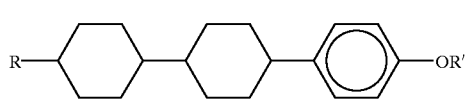 (V-2)
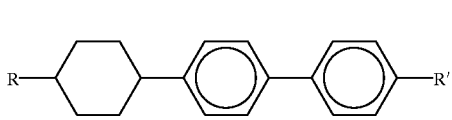 (V-3)
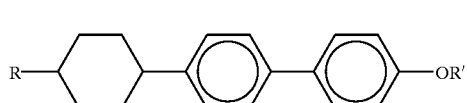 (V-4)
 (V-5)
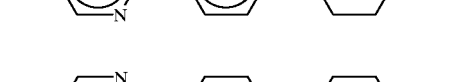 (V-6)
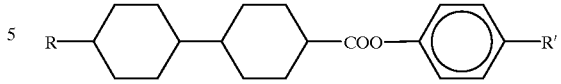 (V-7)
 (V-8)
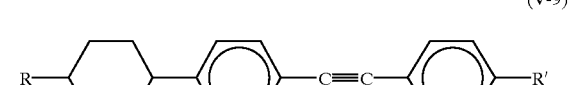 (V-9)
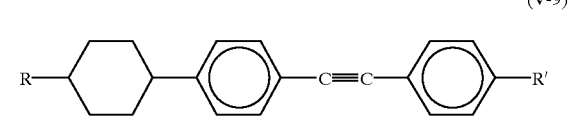 (V-10)
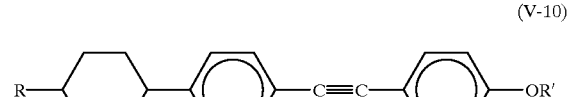 (V-11)
 (V-12)
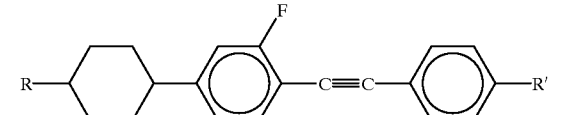 (V-13)
 (V-14)
 (V-15)
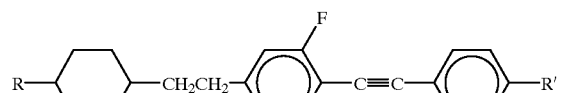 (V-16)
 (VI-a-1)

(VI-a-2)

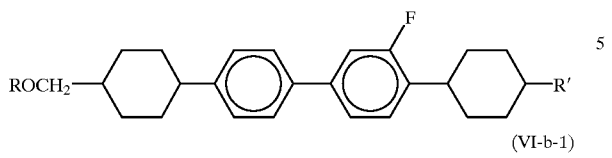

(VI-b-1)

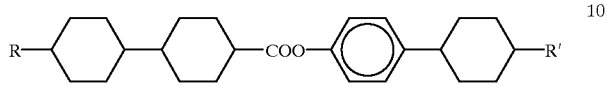

(wherein, R and R' denote each independently an alkyl group. Furthermore, optional one or non-adjacent two or more than two methylene group(s) (—CH$_2$—) in the above-mentioned groups may be substituted by —CH=CH—.)

Amongst these fourth components, in particular, compounds expressed by the formulae (IV-1), (IV-2), (IV-4), (IV-5), (IV-6), (IV-7), (IV-8), (IV-13), (IV-14), (IV-18), (IV-19) or (IV-20) are preferably used as the compounds expressed by the formula (IV). Furthermore, in particular, compounds expressed by the formulae (V-1), (V-2), (V-5), (IV-9), (V-11), (V-12), (V-14) or (V-15) are preferably used as the compounds expressed by the formula (V).

Compounds expressed by the general formulae IV and V, VI-a, VI-b are those with negative or weak positive dielectric anisotropies. Compounds of the general formula IV are used mainly for purposes to lower a viscosity and/or to control Δn. Furthermore, compounds of the general formula V are used for a purpose to enlarge a nematic range such as raising of a transparent point and/or for purposes of Δn control and viscosity control. Compounds of the general formulae VI-a and VI-b have very high transparent points. Thus, they are used for a purpose to enlarge a nematic range such as raising of a transparent point and/or for a purpose of Δn control.

As the compounds expressed by the general formulae VII and VIII according to the invention, the following compounds may be preferably mentioned.

(VII-1)

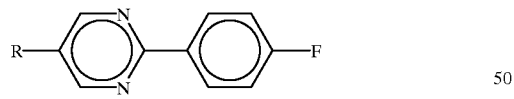

(VII-2)

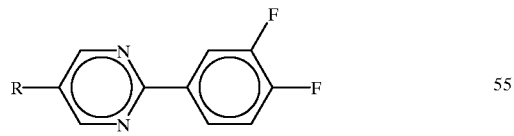

(VII-3)

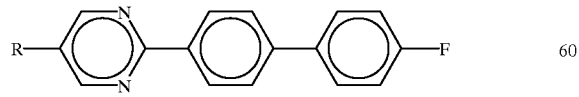

(VIII-1)

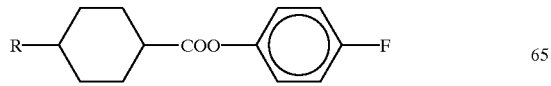

(VIII-2)

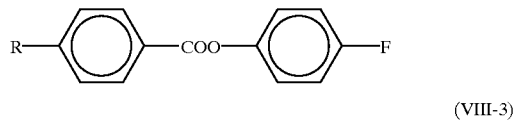

(VIII-3)

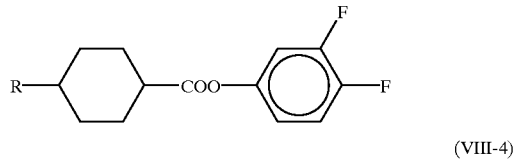

(VIII-4)

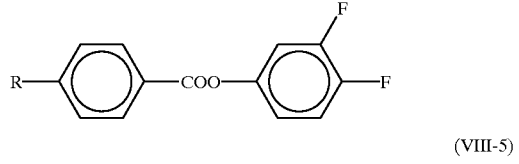

(VIII-5)

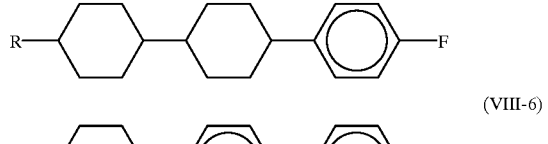

(VIII-6)

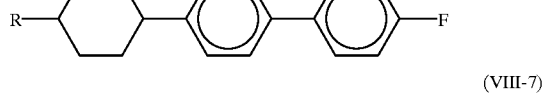

(VIII-7)

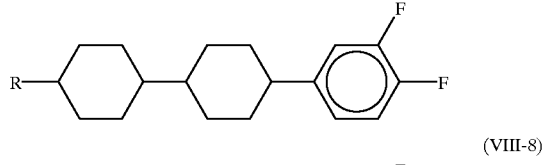

(VIII-8)

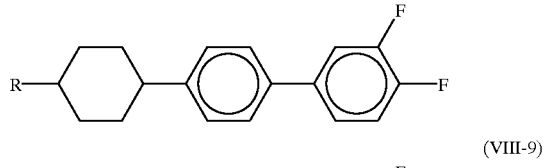

(VIII-9)

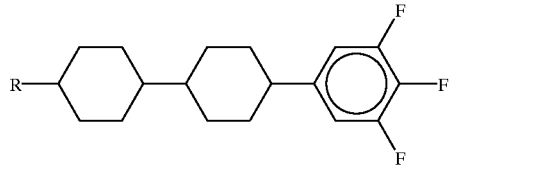

(VIII-10)

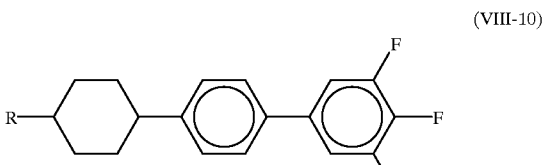

(VIII-11)

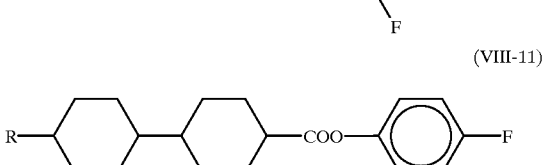

(VIII-12)

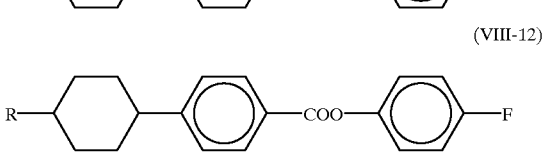

-continued

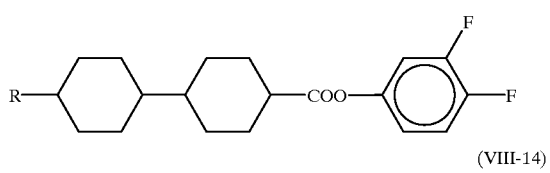
(VIII-13)

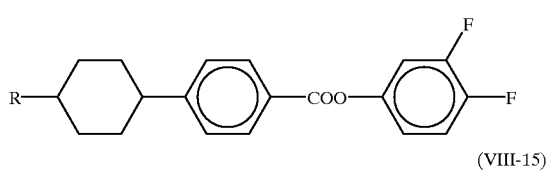
(VIII-14)

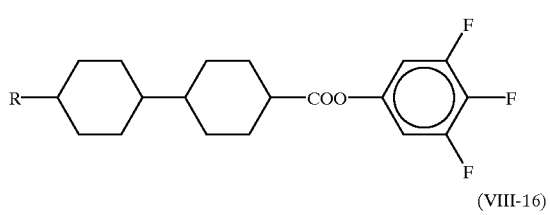
(VIII-15)

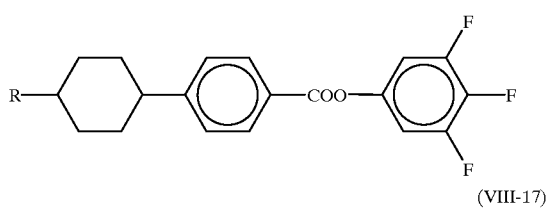
(VIII-16)

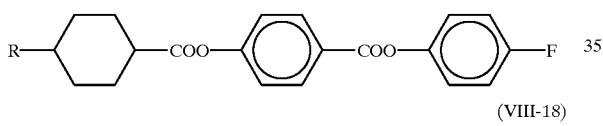
(VIII-17)

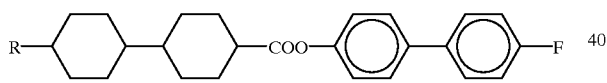
(VIII-18)

(wherein, R denotes an alkyl group.)

As the compounds expressed by the general formula (VII), in particular, compounds expressed by the formulae (VII-1), (VII-2) or (VII-3) are preferably used according to the invention. Furthermore, as the compounds expressed by the general formula (VIII), in particular, compounds expressed by the formulae (VIII-1), (VIII-5), (VIII-6), (VIII-7), (VIII-8), (VIII-9), (VIII-10), (VIII-11), (VIII-12), (VIII-13), (VIII-14), (VIII-15), (VIII-16) or (VIII-18) are preferably used according to the invention.

Compounds expressed by the general formulae VII and VIII are those with positive dielectric anisotropies and they are used particularly for a purpose to lower a threshold voltage and a purpose to improve a temperature dependency. Furthermore, they are used for purposes of viscosity control, Δn control, and nematic range enlargement such as raising of a transparent point.

An amount of the first component used according to the invention is preferably from 3 to 50% by weight based on the total weight of the liquid crystal composition. From 5 to 40% by weight is more preferable. If it being less than 3% by weight, effects of the subjective sharpness and high-speed responce are difficult to be obtained, and if it being above 50% by weight, the threshold voltage of the liquid crystal composition becomes high, which is not desirable. An amount of the second component used is preferably from 3 to 40% by weight. From 4 to 35% by weight is more preferable. If it being less than 3% by weight, effects of the subjective sharpness and high-speed responce are difficult to be obtained, and if it being above 40% by weight, the threshold voltage of the liquid crystal composition becomes high, which is not desirable.

An amount of the third component used is preferably from 10 to 60% by weight. If it being less than 10% by weight, the threshold voltage of the liquid crystal composition becomes high, which is not desirable. If it being above 60% by weight, the viscosity of the liquid crystal composition becomes high, which is not desirable. An amount of the fourth component used is preferably from 0 to 60% by weight. From 0 to 50% by weight is more preferable. If it being above 60% by weight, the threshold voltage of the liquid crystal composition becomes high, which is not desirable. An amount of the fifth component used is preferably from 0 to 50% by weight. From 0 to 40% by weight is more preferable.

In addition to the compounds expressed by the above-mentioned general formulae I to VII, the liquid crystal composition according to the invention may contain another compounds for purposes of controlling a threshold voltage, a nematic range, Δn, a dielectric anisotropy and a viscosity etc., within suitable ranges of amounts not damaging the objects of the invention. As examples of such compounds, the following compounds may be mentioned. In the said compounds, R denotes an alkyl group having from 1 to 10 carbon atoms.

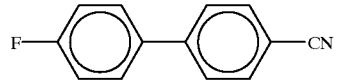

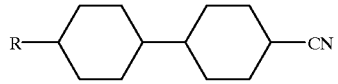

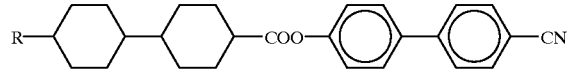

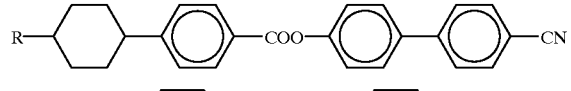

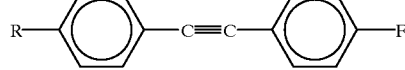

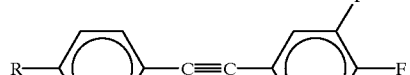

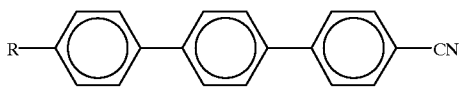

The liquid crystal composition according to the invention is prepared by any of the conventional processes. Generally, there may be used a process to dissolve various components each other at an elevated temperature. Furthermore, the liquid crystal materials of the invention are improved and optimized by means of suitable additives according to their intended applications. The said additives are well-known by the skilled men in the art and described in detail in literatures etc. Generally, a chiral dopant and so on are added in order to derive a spiral structure of liquid crystals and adjust a required twist angle for prevention of reversetwist.

Furthermore, the liquid crystal composition to be used according to the invention can be used as a liquid crystal composition for a guest-host (GH) mode with addition of bichromatic dyes such as merocyanine type, styryl type, azo type, azomethine type, azoxy type, quinophthalone type, anthraquinone type and tetrazine type dyes etc. Alternatively, the composition can be used as a liquid crystal composition for a polymer disperse type liquid crystal display element (PNLCD), for example, NCAP made by microcapsulating nematic crystals or a polymer network liquid crystal display element (PNLCD) having three-dimensional network macromolecules made in liquid crystals. In addition, the composition can be used as a liquid crystal composition for a birefringence control (ECB) mode or a dinamic scattering (DS) mode.

Embodiments

The present invention will be illustrated in detail by the following Examples, but the invention is not limited by them. Composition ratios in Comparative Examples and Examples are all expressed in % or part by weight. Furthermore, ways to express compounds in Comparative Examples and Examples are according to Table 1.

Herein, as to evaluation of a 240° STN cell, a cell thickness d was selected in such a way that the product $\Delta n \cdot d$ of a cell thickness d and a refractive anisotropy $\Delta n$ being about 0.85, and a chiral compound was added in such a way that a ratio d/p of a cell thickness d to a pitch p of a liquid crystal composition being about 0.5 and thereafter poured into a cell.

Evaluation of a cell was carried out by means of an yellow mode and a voltage-transmittance characteristic (V-T characteristic) was determined by means of a rectangular wave of 70 Hz. A ratio of a voltage $V_{90}$ at a transmittance of 90% and a voltage $V_{10}$ at a transmittance of 10% is evaluated as a sharpness $V_{10}/V_{90}$.

Although compounds shown by the following structural formulae were used as chiral compounds, chiral compounds which can be used according to the invention are not limited by them.

TABLE 1

Ways to express compounds by use of symbols

R—(A₁)—Z₁— ··· ··· ··· ··· —Zₙ—(Aₙ)—X

| Left terminal group | Symbol | Bonding group | Symbol |
|---|---|---|---|
| $C_aH_{2a+1}$— | a- | —$CH_2CH_2$— | 2 |
| $C_aH_{2a+1}O$— | aO— | —COO— | E |
| $C_aH_{2a+1}OC_bH_{2b}$— | aOb- | —C≡C— | T |
| $CH_2$=$CHC_aH_{2a}$— | Va- | —CH=CH— | V |
| $C_aH_{2a+1}CH$=$CHC_bH_{2b}$— | aVb- | —$CF_2O$— | CF2O |
| $C_aH_{2a+1}CH$=$CHC_bH_{2b}CH^*CHC_dH_{2d}$— | aVbVd- | —$OCF_2$— | OCF2 |
| $CH_2$=CH— | V— | —CF=CF— | FVF |
| $CH_2$=$CHC_aH_{2a}CH$=CH— | VaV— | | |

| Ring structure | Symbol | Right terminal group | Symbol |
|---|---|---|---|
| ⌬ | B | —F | —F |
| ⌬(F) | B(F) | —Cl | —CL |
| | | —CN | —C |
| ⌬(F) | B(2F) | —$CF_3$ | —CF3 |
| | | —$OCF_3$ | —OCF3 |

TABLE 1-continued

Ways to express compounds by use of symbols

R―(A₁)―Z₁―··············―Zₙ―(Aₙ)―X

| Ring | Symbol | Z / side chain | Abbreviation |
|---|---|---|---|
| (2,5-disubstituted fluorobenzene) | B(6F) | —OCF₂H<br>—CwH₂w₊₁<br>—OCwH₂w₊₁ | —OCF2H<br>—w<br>—Ow |
| (2,3-difluorobenzene) | B(2F, 3F) | —COOCH₃<br>—CH=CH₂ | —EMe<br>—V |
| (trifluorobenzene) | B(F, F) | —CₐH₂ₐCH=CH₂<br>—CₐH₂ₐCH=CHC_bH_{2b+1} | —aV<br>—aVb |
| (cyclohexane) | H | —OCₐH₂ₐCH=CH₂ | —OaV |
| (pyrimidine) | Py | —CH=CF₂ | —VFF |
| (dioxane) | D | —CₐH₂ₐCH=CF₂<br>—CH=CHF | —aVFF<br>—VF |
| (cyclohexane, chiral) | Ch | —CₐH₂ₐCH=CHF | —aVF |
| (pyridazine) | Pn | —CₐH₂ₐCH=CHC₂H₄CH=CH₂ | —aV2V |

Comparative Example 1

A composition A was prepared from the following components:

| | |
|---|---|
| 3-HB-C | 24% |
| 5-HB-C | 36% |
| 7-HB-C | 25% |
| 5-HBB-C | 15%. |

A transparent point of this composition A was $T_{NI}$=72.4 (° C.), a viscosity at 20° C. was $\eta_{20}$=27.0 (mPa·s), a refractive anisotropy at 25° C. was $\Delta n$=0.137, a dielectric anisotropy at 20° C. was $\Delta\epsilon$=11.0, and a threshold voltage at 20° C. was Vth=1.78 (V).

Comparative Example 2

A liquid crystal composition was prepared by mixing 85 parts by wight of the composition A in Comparative Example 1 and 15 parts by weight of a compounds having the following formula:

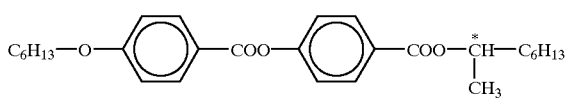

3-HH-VFF.

A transparent point of this liquid crystal composition was $T_{NI}$=67.6 (° C.), a viscosity at 20° C. was $\eta_{20}$=20.2 (mPa·s), a refractive anisotropy at 25° C. was $\Delta n$=0.123, a dielectric anisotropy at 20° C. was $\Delta\epsilon$=9.6, and a threshold voltage at 20° C. was Vth=1.74 (V).

0.80 parts by weight of a chiral compound CM-33 was added to 100 parts by weight of this liquid crystal composition to prepare a composition, which was then poured into a 240° STN cell having a thickness of d=6.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=1.95 (V), a voltage $V_{10}$ at a transmittance of 10%=2.50 (V) and a sharpness V10/V90=1.282.

EXAMPLE 1

| | |
|---|---|
| 1V2-BEB (F, F) -C | 10% |
| 3-HB-C | 12% |
| 3-HB-02 | 6% |
| 5-HH-VFF | 20% |
| 3-HHB-1 | 7% |
| 3-H2BTB-2 | 5% |
| 3-H2BTB-3 | 5% |
| 3-H2BTB-4 | 4% |
| 1-BHH-VFF | 18% |
| 1-BBH-VFF | 13% |

A transparent point of this liquid crystal composition was $T_{NI}$=100.8 (° C.), a viscosity at 20° C. was $\eta_{20}$=16.7 (mPa·s), a refractive anisotropy at 25° C. was $\Delta n$=0.132, a dielectric anisotropy at 20° C. was $\Delta\epsilon$=8.7, and a threshold voltage at 20° C. was Vth=2.05 (V).

0.56 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.23 (V), a voltage $V_{10}$ at a transmittance of 10%=2.42 (V) and a sharpness $V_{10}/V_{90}$=1.085. Furthermore, a response time (the sum of a response time from OFF-state to ON-state and a response time from ON-state to OFF-state) was determined at a driving voltage of 27.6 V by using a voltage waveform of 1/240 duty1/16 bias, to obtain $\tau_{total}$=252 (msec).

As compared with compositions in Comparative Examples 1 and 2, the transparent point became high and the viscosity became low. Furthermore, the sharpness was more improved than the compositon in the Comparative Example 2.

EXAMPLE 2

| | |
|---|---|
| 1V2-BEB (F, F) -C | 11.5% |
| 3-HB-C | 4.5% |
| 3-HB-02 | 4% |
| 5-HH-VFF | 30% |
| 3-HB (F) TB-2 | 4% |
| 3-H2BTB-2 | 4% |
| 3-H2BTB-3 | 4% |
| 3-H2BTB-4 | 4% |
| 1-BHH-VFF | 19.5% |
| 1-BBH-VFF | 14.5% |

A transparent point of this liquid crystal composition was $T_{NI}$=100.7 (° C.), a viscosity at 20° C. was $\eta_{20}$=16.6 (mPa·s), a refractive anisotropy at 25° C. was $\Delta n$=0.132, a dielectric anisotropy at 20° C. was $\Delta\epsilon$=8.0, and a threshold voltage at 20° C. was Vth=2.10 (V).

0.51 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.30 (V), a voltage $V_{10}$ at a transmittance of 10%=2.51 (V) and a sharpness $V_{10}/V_{90}$=1.091. Furthermore, a response time (the sum of a response time from OFF-state to ON-state and a response time from ON-state to OFF-state) was determined at a driving voltage of 28.5 V by using a voltage waveform of 1/240 duty 1/16 bias, to obtain $\tau_{total}$=212 (msec).

As compared with compositions in Comparative Examples 1 and 2, the transparent point became high and the viscosity became low. Furthermore, the sharpness was more improved than the compositon in the Comparative Example 2.

EXAMPLE 3

| | |
|---|---|
| 1V2-BEB (F, F) -C | 12.5% |
| 3-HB-C | 4% |
| 3-HB-02 | 5% |
| 5-HH-VFF | 30% |
| 3-HHB-1 | 3.5% |
| 3-HB (F) TB-2 | 5% |
| 3-HB (F) TB-3 | 4% |
| 3-HB (F) TB-4 | 4% |
| 3-H2BTB-2 | 4% |
| 3-H2BTB-3 | 4% |
| 3-H2BTB-4 | 4% |
| 1-BHH-VFF | 20% |

A transparent point of this liquid crystal composition was $T_{NI}$=100.4 (° C.), a viscosity at 20° C. was $\eta_{20}$=15.1 (mPa·s), a refractive anisotropy at 25° C. was $\Delta n$=0.133, a dielectric anisotropy at 20° C. was $\Delta\epsilon$=8.2, and a threshold voltage at 20° C. was Vth=2.06 (V).

0.50 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.24 (V), a voltage $V_{10}$ at a transmittance of 10%=2.44 (V) and a sharpness $V_{10}/V_{90}$=1.089. Furthermore, a response time (the sum of a response time from OFF-state to ON-state and a response time from ON-state to OFF-state) was determined at a driving voltage of 27.9 V by using a voltage waveform of 1/240 duty 1/16 bias, to obtain $\tau_{total}=224$ (msec).

As compared with compositions in Comparative Examples 1 and 2, the transparent point became high and the viscosity became low. Furthermore, the sharpness was more improved than the compositon in the Comparative Example 2.

EXAMPLE 4

| | |
|---|---|
| 2-BEB (F) -C | 2% |
| 3-BEB (F) -C | 1% |
| 4-BEB (F) -C | 2% |
| V-HB-C | 12% |
| 4-PyB-C | 4% |
| 5-PyB-C | 3% |
| 4-BB-2 | 11% |
| 5-HH-V | 18% |
| 5-HH-VFF | 4% |
| 5-HH-VF | 2% |
| V-HHB-1 | 7% |
| V2-HHB-1 | 15% |
| 3-HHB-O2V | 4% |
| 2-BBH-VF | 3% |
| 1-BBH-VFF | 3% |
| 1V2-HBB-2 | 4% |
| 3-HHEBH-3 | 2.5% |
| 3-HHEBH-4 | 2.5% |

A transparent point of this liquid crystal composition was $T_{NI}=100.0$ (° C.), a viscosity at 20° C. was $\eta_{20}=17.8$ (mPa·s), a refractive anisotropy at 25° C. was $\Delta n=0.135$, a dielectric anisotropy at 20° C. was $\Delta\epsilon=7.8$, and a threshold voltage at 20° C. was Vth=2.09 (V).

0.60 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.34 (V), a voltage $V_{10}$ at a transmittance of 10%=2.55 (V) and a sharpness $V_{10}/V_{90}=1.090$.

As compared with compositions in Comparative Examples 1 and 2, the transparent point became high and the viscosity became low. Furthermore, the sharpness was more improved than the compositon in the Comparative Example 2.

EXAMPLE 5

| | |
|---|---|
| 1V2-BEB (F, F) -C | 13% |
| V2V-HB-C | 10% |
| V2V-HB-1 | 5% |
| V2V-HH-1 | 10% |
| V2V-HH-3 | 10% |
| 3-HH-1VFF | 2% |
| 3-HH-2VFF | 2% |
| 3-HH-VF | 2% |
| 3-HHB-1 | 5% |
| V2V-HHB-1 | 13% |
| 1-BHH-VFF | 2% |
| V2V-HBB-1 | 14% |
| 1-BBH-2VF | 2% |
| 3-H2BTB-2 | 5% |
| 3-H2BTB-3 | 5% |

A transparent point of this liquid crystal composition was $T_{NI}=101.0$ (° C.), a viscosity at 20° C. was $\eta_{20}=16.0$ (mPa·s), a refractive anisotropy at 25° C. was $\Delta n=0.132$, a dielectric anisotropy at 20° C. was $\Delta\epsilon=8.4$, and a threshold voltage at 20° C. was Vth=2.06 (V).

0.58 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.28 (V), a voltage $V_{10}$ at a transmittance of 10%=2.49 (V) and a sharpness $V_{10}/V_{90}=1.092$. Furthermore, a response time (the sum of a response time from OFF-state to ON-state and a response time from ON-state to OFF-state) was determined at a driving voltage of 28.2 V by using a voltage waveform of 1/240 duty 1/16 bias, to obtain $\tau_{total}=232$ (msec).

As compared with compositions in Comparative Examples 1 and 2, the transparent point became high and the viscosity became low. Furthermore, the sharpness was more improved than the compositon in the Comparative Example 2.

EXAMPLE 6

| | |
|---|---|
| 1V2-BEB (F, F) -C | 8% |
| 3-HB-C | 24% |
| 3-HB-O2 | 4% |
| 3-HH-4 | 10% |
| 3-HH-5 | 3% |
| 5-HH-VFF | 2% |
| 3-HH-VF | 2% |
| 5-HH-2 | 2% |
| 3-HHB-1 | 10% |
| 3-HHB-3 | 7% |
| 3-H2BTB-2 | 5% |
| 3-H2BTB-3 | 4% |
| 3-H2BTB-4 | 4% |
| 1-BBH-VFF | 2% |
| 1-BBH-3VF | 2% |
| V2V-HBB-1 | 11% |

A transparent point of this liquid crystal composition was $T_{NI}=100.3$ (° C.), a viscosity at 20° C. was $\eta_{20}=17.3$ (mPa·s), a refractive anisotropy at 25° C. was 66 n=0.131, a dielectric anisotropy at 20° C. was $\Delta\epsilon=8.9$, and a threshold voltage at 20° C. was Vth=2.06 (V).

0.60 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.30 (V), a voltage $V_{10}$ at a transmittance of 10%=2.51 (V) and a sharpness $V_{10}/V_{90}=1.091$.

As compared with compositions in Comparative Examples 1 and 2, the transparent point became high and the viscosity became low. Furthermore, the sharpness was more improved than the compositon in the Comparative Example 2.

EXAMPLE 7

| | | |
|---|---|---|
| 1V2-BEB (F, F) -C | 8% | |
| 3-HB-C | 21% | |
| 3-HB-02 | 4% | |
| 3-HH-4 | 11% | |
| 3-HH-5 | 3% | |
| 3-HH-VFF | 2% | |
| 5-HH-VFF | 2% | |
| 3-HHB-1 | 12% | |
| 3-H2BTB-2 | 4% | |
| 3-H2BTB-3 | 4% | |
| 3-H2BTB-4 | 4% | |
| 3-HB (F) TB-2 | 5% | |
| 3-HB (F) TB-3 | 5% | |
| 1-BHH-VFF | 15% | |

A transparent point of this liquid crystal composition was $T_{NI}=101.8$ (° C.), a viscosity at 20° C. was $\eta_{20}=15.9$ (mPa·s), a refractive anisotropy at 25° C. was $\Delta n=0.133$, a dielectric anisotropy at 20° C. was $\Delta\epsilon=8.2$, and a threshold voltage at 20° C. was Vth=2.10 (V).

0.59 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.32 (V), a voltage $V_{10}$ at a transmittance of 10%=2.51 (V) and a sharpness $V_{10}/V_{90}=1.082$.

As compared with compositions in Comparative Examples 1 and 2, the transparent point became high and the viscosity became low. Furthermore, the sharpness was more improved than the compositon in the Comparative Example 2.

EXAMPLE 8

| | | |
|---|---|---|
| IV2-BEB(F,F)-C | 8% | |
| 3-HB-C | 22% | |
| 3-HB-02 | 4% | |
| 3-HH-4 | 11% | |
| 3-HH-5 | 2% | |
| 3-HH-VF | 2% | |
| 5-HH-VFF | 2% | |
| 3-HHB-1 | 10% | |
| 3-HHB-3 | 10% | |
| 3-H2BTB-2 | 5% | |
| 3-H2BTB-3 | 5% | |
| 3-H2BTB-4 | 4% | |
| 1-BHH-VFF | 15% | |

A transparent point of this liquid crystal composition was $T_{NI}=100.7$ (° C.), a viscosity at 20° C. was $\eta_{20}=16.6$ (mPa·s), a refractive anisotropy at 25° C. was $\Delta n=0.132$, a dielectric anisotropy at 20° C. was $\Delta\epsilon=8.5$, and a threshold voltage at 20° C. was Vth=2.07 (V).

0.63 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.24 (V), a voltage $V_{10}$ at a transmittance of 10%=2.46 (V) and a sharpness $V_{10}/V_{90}=1.098$.

As compared with compositions in Comparative Examples 1 and 2, the transparent point became high and the viscosity became low. Furthermore, the sharpness was more improved than the compositon in the Comparative Example 2.

EXAMPLE 9

| | | |
|---|---|---|
| 1V2-BEB (F, F) -C | 8% | |
| 3-HB-C | 24% | |
| 3-HB-02 | 5% | |
| 3-HH-4 | 10% | |
| 3-HH-5 | 2% | |
| 3-HH-VF | 2% | |
| 3-HH-2VFF | 2% | |
| 3-HHB-3 | 16% | |
| 3-HB (F) TB-2 | 5% | |
| 3-HB (F) TB-3 | 4% | |
| 3-H2BTB-2 | 4% | |
| 3-H2BTB-3 | 4% | |
| 3-H2BTB-4 | 4% | |
| V2V-HHB-1 | 6% | |
| 1-BHH-VFF | 4% | |

A transparent point of this liquid crystal composition was $T_{NI}=101.1$ (° C.), a viscosity at 20° C. was η20=16.5 (mPa·s), a refractive anisotropy at 25° C. was $\Delta n=0.133$, a dielectric anisotropy at 20° C. was $\Delta\epsilon=7.9$, and a threshold voltage at 20° C. was Vth=2.11 (V).

0.64 parts by weight of a chiral compound CM-33 was added to 100 parts by weight of this liquid crystal composition to prepare a composition, which was then poured into a 240° STN cell having a thickness of d=5.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.34 (V), a voltage $V_{10}$ at a transmittance of 10%=2.56 (V) and a sharpness $V_{10}/V_{90}=1.094$.

As compared with compositions in Comparative Examples 1 and 2, the transparent point became high and the viscosity became low. Furthermore, the sharpness was more improved than the compositon in the Comparative Example 2.

EXAMPLE 10

A liquid crystal composition consisting of the following components was prepared:

| | | |
|---|---|---|
| 3-HH-VFF | 9% | |
| 5-HH-VFF | 16% | |
| 2-HB-C | 11% | |
| 3-HB-C | 17% | |
| 2-HHB-G | 5% | |
| 3-HHB-C | 5% | |
| 4-HHB-C | 5% | |

-continued

| | |
|---|---|
| 5-HHB-C | 5% |
| 1-BHH-VFF | 5% |
| 2-BFVFB-2 | 5% |
| 3-BFVFB-3 | 5% |
| 4-BFVFB-4 | 5% |
| 5-BFVFB-5 | 7%. |

A transparent point of this liquid crystal composition was $T_{NI}$=87.6 (° C.), a viscosity at 20° C. was $\eta_{20}$=14.0 (mPa·s), a refractive anisotropy at 25° C. was $\Delta n$=0.134, a dielectric anisotropy at 20° C. was $\Delta\epsilon$=7.2, and a threshold voltage at 20° C. was Vth=2.03 (V).

0.85 parts by weight of a chiral compound CM-33 was added to 100 parts by weight of this liquid crystal composition to prepare a composition, which was then poured into a 240° STN cell having a thickness of d=6.4 µm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.25 (V), a voltage $V_{10}$ at a transmittance of 10%=2.42 (V) and a sharpness $V_{10}/V_{90}$=1.076.

As compared with compositions in Comparative Examples 1 and 2, the transparent point became high and the viscosity became low. Furthermore, the sharpness was more improved than the compositon in the Comparative Example 2.

EXAMPLE 11

A liquid crystal composition consisting of the following components was prepared:

| | |
|---|---|
| 3-HH-VFF | 12% |
| 5-HH-VFF | 19% |
| 2-HB-C | 6% |
| 3-HB-C | 18% |
| 2-HHB-C | 5% |
| 3-HHB-C | 6% |
| 4-HHB-C | 5% |
| 5-HHB-C | 5% |
| 2-BTB-01 | 4% |
| 3-BTB-01 | 4% |
| 4-BTB-01 | 4% |
| 4-BTB-02 | 4% |
| 5-BTB-01 | 4% |
| 1-BHH-VFF | 4%. |

A transparent point of this liquid crystal composition was $T_{NI}$=85.3 (° C.), a viscosity at 20° C. was $\eta_{20}$=16.0 (mPa·s), a refractive anisotropy at 25° C. was $\Delta n$=0.133, a dielectric anisotropy at 20° C. was $\Delta\epsilon$=6.5, and a threshold voltage at 20° C. was Vth=2.03 (V).

0.80 parts by weight of a chiral compound CM-33 was added to 100 parts by weight of this liquid crystal composition to prepare a composition, which was then poured into a 240° STN cell having a thickness of d=6.4 µm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.24 (V), a voltage $V_{10}$ at a transmittance of 10%=2.37 (V) and a sharpness $V_{10}/V_{90}$=1.054.

As compared with compositions in Comparative Examples 1 and 2, the transparent point became high and the viscosity became low. Furthermore, the sharpness was more improved than the compositon in the Comparative Example 2.

EXAMPLE 12

A liquid crystal composition consisting of the following components was prepared:

| | |
|---|---|
| 3-HH-VFF | 8% |
| 5-HH-VFF | 12% |
| 3-HB-C | 10% |
| V2-HB-C | 14% |
| 1V2-HB-C | 14% |
| 2-BTB-01 | 9% |
| 3-HHB-1 | 4% |
| 1-BHH-1VFF | 2% |
| 1-BHH-2VFF | 2% |
| 3-HHB-01 | 3% |
| 3-HB (F) TB-2 | 5% |
| 3-HB (F) TB-3 | 5% |
| 3-H2BTB-2 | 4% |
| 3-H2BTB-3 | 4% |
| 3-H2BTB-4 | 4% |

A transparent point of this liquid crystal composition was $T_{NI}$=90.0 (° C.), a viscosity at 20° C. was $\eta_{20}$=15.0 (mPa·s), a refractive anisotropy at 25° C. was $\Delta n$=0.153, a dielectric anisotropy at 20° C. was $\Delta\epsilon$=6.0, and a threshold voltage at 20° C. was Vth=2.29 (V).

0.85 parts by weight of a chiral compound CM-33 was added to 100 parts by weight of this liquid crystal composition to prepare a composition, which was then poured into a 240° STN cell having a thickness of d=5.5 µm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.45 (V), a voltage $V_{10}$ at a transmittance of 10%=2.53 (V) and a sharpness $V_{10}/V_{90}$=1.034.

As compared with compositions in Comparative Examples 1 and 2, the transparent point became high and the viscosity became low. Furthermore, the sharpness was more improved than the compositon in the Comparative Example 2.

EXAMPLE 13

A liquid crystal composition consisting of the following components was prepared:

| | |
|---|---|
| 5-HH-VFF | 13% |
| 3-HB-C | 15% |
| V2-HB-C | 8% |
| 1V2-HB-C | 7% |
| 3-PyBB-F | 6% |
| 2-BTB-1 | 7.25% |
| 1-BTB-6 | 14.5% |
| 4-BTB-4 | 7.25% |
| 3-HHB-1 | 2% |
| 1-BHH-3VFF | 2% |
| 1-BHH-1VF | 2% |
| 3-H2BTB-2 | 4% |
| 3-H2BTB-3 | 4% |
| 3-H2BTB-4 | 4% |
| 3-HB (F) TB-2 | 4% |

A transparent point of this liquid crystal composition was $T_{NI}$=70.0 (° C.), a viscosity at 20° C. was $\eta 20$=15.9 (mPa·s), a refractive anisotropy at 25° C. was Δn=0.170, a dielectric anisotropy at 20° C. was Δε=5.5, and a threshold voltage at 20° C. was Vth=2.01 (V).

1.09 parts by weight of a chiral compound CM-33 was added to 100 parts by weight of this liquid crystal composition to prepare a composition, which was then poured into a 240° STN cell having a thickness of d=5.0 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.11 (V), a voltage $V_{10}$ at a transmittance of 10%=2.41 (V) and a sharpness $V_{10}/V_{90}$=1.142.

As compared with compositions in Comparative Examples 1 and 2, the transparent point became high and the viscosity became low. Furthermore, the sharpness was more improved than the compositon in the Comparative Example 2.

EXAMPLE 14

A liquid crystal composition consisting of the following components was prepared:

| | |
|---|---|
| 5-HH-VFF | 13% |
| 3-HH-1VF | 2% |
| V2-HB-C | 2% |
| 1V2-HB-C | 8% |
| 1V2-BEB (F, F) -C | 2% |
| 5-PyB-F | 2% |
| 3-HHB-F | 2% |
| 3-HHB-O1 | 2% |
| 3-HHB-1 | 2% |
| 3-HHB-3 | 13% |
| 1-BHH-2VF | 2% |
| 1-BHH-3VF | 2% |
| 3-HB (F) TB-2 | 2% |
| 3-H2BTB-2 | 2% |
| 3-H2BTB-3 | 2% |
| 3-H2BTB-3 | 2% |

A transparent point of this liquid crystal composition was $T_{NI}$=101.7 (° C.), a viscosity at 20° C. was $\eta_{20}$=17.0 (mPa·s), a refractive anisotropy at 25° C. was Δn=0.133, and a threshold voltage at 20° C. was Vth=2.00 (V).

0.59 parts by weight of a chiral compound CM-33 was added to 100 parts by weight of this liquid crystal composition to prepare a composition, which was then poured into a 240° STN cell having a thickness of d=6.4 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.19 (V), a voltage $V_{10}$ at a transmittance of 10%=2.34 (V) and a sharpness $V_{10}/V_{90}$=1.068.

As compared with compositions in Comparative Examples 1 and 2, the transparent point became high and the viscosity became low. Furthermore, the sharpness was more improved than the compositon in the Comparative Example 2.

EXAMPLE 15

A liquid crystal composition consisting of the following components was prepared:

| | |
|---|---|
| 5-HH-VFF | 13% |
| 3-HH-2VF | 2% |
| 3-HB-C | 17% |
| 1V2BEB (F, F) -C | 8% |
| 3-HHB-F | 5% |
| 3-PyB-2 | 4% |
| 3-HB-O2 | 5% |
| 3-HHB-O1 | 2% |
| 3-HHB-1 | 8% |
| 3-HHB-3 | 15% |
| 1-BHH-VFF | 2% |
| 1 BBH-1VFF | 2% |
| 3-H2BTB-2 | 3% |
| 3-H2BTB-3 | 3% |
| 3-H2BVB-3 | 4% |
| 3-HB (F) TB-2 | 7% |

A transparent point of this liquid crystal composition was $T_{NI}$=101.5 (° C.), a viscosity at 20° C. was $\eta_{20}$=16.2 (mPa·s), a refractive anisotropy at 25° C. was Δn=0.130, and a threshold voltage at 20° C. was Vth=2.07 (V).

0.55 parts by weight of a chiral compound CM-33 was added to 100 parts by weight of this liquid crystal composition to prepare a composition, which was then poured into a 240° STN cell having a thickness of d=6.5 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.19 (V), a voltage $V_{10}$ at a transmittance of 10%=2.36 (V) and a sharpness $V_{10}/V_{90}$=1.078.

As compared with compositions in Comparative Examples 1 and 2, the transparent point became high and the viscosity became low. Furthermore, the sharpness was more improved than the compositon in the Comparative Example 2.

EXAMPLE 16

A liquid crystal composition consisting of the following components was prepared:

| | |
|---|---|
| 3-HH-VFF | 14% |
| 5-HH-VFF | 15% |
| 3-HH-3VF | 2% |
| 3-H2B-C | 4% |
| 3-HB-C | 6% |
| 1V2-BEB (F, F) -C | 10% |
| 2-BTB-O1 | 10% |
| 4-BTB-O2 | 5% |
| 5-BTB-O1 | 5% |
| 3-HHB-1 | 6% |
| 3-HHB-O1 | 4% |
| 3-HHB-3 | 12% |
| 1-BHH-VFF | 2% |
| 1-BHH-VF | 2% |
| 3-H2BTB-2 | 3% |

A transparent point of this liquid crystal composition was $T_{NI}$=78.0 (° C.), a viscosity at 20° C. was $\eta_{20}$=12.9 (mPa·s), a refractive anisotropy at 25° C. was Δn=0.133, a dielectric anisotropy at 20° C. was Δε=6.5, and a threshold voltage at 20° C. was Vth=1.93 (V).

0.82 parts by weight of a chiral compound CM-33 was added to 100 parts by weight of this liquid crystal composition to prepare a composition, which was then poured into a 240° STN cell having a thickness of d=6.4 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.15 (V), a voltage $V_{10}$ at a transmittance of 10%=2.30 (V) and a sharpness $V_{10}/V_{90}$=1.070.

EXAMPLE 17

A liquid crystal composition consisting of the following components was prepared:

| | |
|---|---|
| 5-HH-2VFF | 10% |
| 3-HH-3VFF | 2% |
| 2-BB-C | 8% |
| 4-BB-C | 8% |
| 5-BB-C | 8% |
| 2-HB-C | 6% |
| 3-HHB-C | 8% |
| 3-PyB (F) -F | 5% |
| 3-HHB-F | 4% |
| 3-HBEB-F | 4% |
| 3-HB-02 | 4% |
| 101-HH-3 | 4% |
| 3-HH-4 | 4% |
| 2-HHB-1 | 2% |
| 3-HHB-1 | 3% |
| 3-HHB-01 | 3% |
| 3-HHB-3 | 13% |
| 1-BHH-VFF | 2% |
| 1-BHH-VF | 2% |

A transparent point of this liquid crystal composition was $T_{NI}$=76.0 (° C.), a viscosity at 20° C. was $\eta_{20}$=19.6 (mPa·s), a refractive anisotropy at 25° C. was Δn=0.120, a dielectric anisotropy at 20° C. was Δε=7.2, and a threshold voltage at 20° C. was Vth=1.79 (V).

0.80 parts by weight of a chiral compound CM-33 was added to 100 parts by weight of this liquid crystal composition to prepare a composition, which was then poured into a 240° STN cell having a thickness of d=7.0 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=1.92 (V), a voltage $V_{10}$ at a transmittance of 10%=2.09 (V) and a sharpness $V_{10}/V_{90}$=1.089.

EXAMPLE 18

A liquid crystal composition consisting of the following components was prepared:

| | |
|---|---|
| 5-HH-1VFF | 10% |
| 3-PyB (F) -F | 10% |
| 3-HB (F) -C | 8% |
| 3-HH-4 | 7% |
| 2-PyB-2 | 4% |
| 3-PyB-2 | 4% |
| 4-PyB-2 | 4% |
| 2-HHB-C | 4% |
| 3-HHB-C | 6% |
| 2-HHB (F) -F | 7% |
| 3-HHB (F) -F | 7% |
| 5-HHB (F) -F | 7% |
| 3-HHB-1 | 4% |

-continued

| | |
|---|---|
| 1-BHH-VFF | 4% |
| 3-HHB-01 | 4% |
| 3-PyBB-F | 5% |
| 4-PyBB-F | 5% |

A transparent point of this liquid crystal composition was $T_{NI}$=75.8 (° C.), a viscosity at 20° C. was η20=18.5 (mPa·s), a refractive anisotropy at 25° C. was Δn=0.110, a dielectric anisotropy at 20° C. was Δε=7.8, and a threshold voltage at 20° C. was Vth=1.70 (V).

0.78 parts by weight of a chiral compound CM-33 was added to 100 parts by weight of this liquid crystal composition to prepare a composition, which was then poured into a 240° STN cell having a thickness of d=7.5 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=1.86 (V), a voltage $V_{10}$ at a transmittance of 10%=2.03 (V) and a sharpness $V_{10}/V_{90}$=1.091.

EXAMPLE 19

A liquid crystal composition consisting of the following components was prepared:

| | |
|---|---|
| 3-HH-VFF | 7% |
| 5-HH-VFF | 7% |
| 201-BEB (F) -C | 8% |
| 301-BEB (F) -C | 8% |
| 2-HB (F) -C | 7% |
| 2-HHB (F) -F | 12% |
| 3-HHB (F) -F | 12% |
| 5-HHB (F) -F | 12% |
| 2-HBB (F) -F | 2% |
| 3-HBB (F) -F | 2% |
| 1-BBH-2VFF | 2% |
| 1-BBH-3VFF | 4% |
| 3-PyBB-F | 3% |
| 3-H2BTB-2 | 3% |
| 3-H2BTB-3 | 3% |
| 3-H2BVB-3 | 3% |
| 3-HB (F) TB-2 | 3% |
| 3-HB (F) TB-2 | 3% |

A transparent point of this liquid crystal composition was TNI=85.3 (° C.), a viscosity at 20° C. was η20=23.2 (mPa·s), a refractive anisotropy at 25° C. was Δn=0.125, a dielectric anisotropy at 20° C. was Δε=10.8, and a threshold voltage at 20° C. was Vth=1.43 (V).

0.80 parts by weight of a chiral compound CM-33 was added to 100 parts by weight of this liquid crystal composition to prepare a composition, which was then poured into a 24° STN cell having a thickness of d=6.9 μm, and the cell was evaluated by means of an yellow mode.

A voltage-transmittance characteristic (V-T characteristic) was determined by a rectangular wave of 70 Hz, to obtain a voltage V90 at a transmittance of 90%=1.50 (V), a voltage V10 at a transmittance of 10%=1.64 (V) and a sharpness V10/V90=1.093.

EXAMPLE 20

A liquid crystal composition consisting of the following components was prepared:

| | |
|---|---|
| 4-HH-VFF | 6% |
| 5-HH-VFF | 7% |
| 2-BEB-C | 5% |
| 3-HB-C | 10% |
| 101-HB-C | 6% |
| 3-HEB-04 | 6% |
| 5-HEB-01 | 6% |
| 4-HEB-3 | 6% |
| 4-HEB-4 | 6% |
| 3-HHEB (F, F) -F | 4% |
| 3-HHEB-F | 4% |
| 3-HBEB (F, F) -F | 4% |
| 3-HBEB-F | 4% |
| 2-HHB (F) -F | 4% |
| 3-HHB (F) -F | 4% |
| 5-HHB (F) -F | 4% |
| 1-BBH-VF | 2% |
| 1-BBH-1VF | 2% |
| 3-PyBB-F | 3% |
| 4-PyBB-F | 3% |
| 5-PyBB-F | 4% |

A transparent point of this liquid crystal composition was $T_{NI}=80.6$ (° C.), a viscosity at 20° C. was $\eta_{20}=24.0$ (mPa·s), a refractive anisotropy at 25° C. was $\Delta n=0.110$, a dielectric anisotropy at 20° C. was $\Delta\epsilon=7.5$, and a threshold voltage at 20° C. was Vth=1.60 (V).

0.48 parts by weight of a chiral compound CM-33 was added to 100 parts by weight of this liquid crystal composition to prepare a composition, which was then poured into a 240° STN cell having a thickness of d=7.5 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=1.74 (V), a voltage $V_{10}$ at a transmittance of 10%=1.89 (V) and a sharpness $V_{10}/V_{90}=1.086$.

EXAMPLE 21

A liquid crystal composition consisting of the following components was prepared:

| | |
|---|---|
| 3-HH-VFF | 6% |
| 5-HH-VFF | 8% |
| 201-BEB (F) -C | 8% |
| 301-BEB (F) -C | 8% |
| 2-HB (F) -C | 7% |
| 2-HHB (F) -F | 13% |
| 3-HHB (F) -F | 12% |
| 5-HHB (F) -F | 11% |
| 2-HBB (F) -F | 2% |
| 3-HBB (F) -F | 2% |
| 1-BBH-2VFF | 2% |
| 1-BBH-3VFF | 2% |
| 3-PyBB-F | 4% |
| 3-H2BTB-2 | 2% |
| 3-H2BTB-3 | 2% |
| 3-H2BVB-3 | 3% |
| 101-HBB (F) H-3 | 2% |
| 3-HB (F) TB-2 | 3% |
| 3-HB (F) VB-2 | 3% |

A transparent point of this liquid crystal composition was $T_{NI}=86.0$ (° C.), a viscosity at 20° C. was $\eta_{20}=23.9$ (mPa·s), a refractive anisotropy at 25° C. was $\Delta n=0.126$, a dielectric anisotropy at 20° C. was $\Delta\epsilon=11.0$, and a threshold voltage at 20° C. was Vth=1.45 (V).

0.80 parts by weight of a chiral compound CM-33 was added to 100 parts by weight of this liquid crystal composition to prepare a composition, which was then poured into a 240° STN cell having a thickness of d=6.9 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=1.52 (V), a voltage $V_{10}$ at a transmittance of 10%=1.66 (V) and a sharpness $V_{10}/V_{90}=1.092$.

EXAMPLE 22

A liquid crystal composition consisting of the following components was prepared:

| | |
|---|---|
| 5-HH-VFF | 13% |
| 3-HB-C | 16% |
| V2-HB-C | 7% |
| 1V2-HB-C | 7% |
| 3-PyBB-F | 6% |
| 2-BTB-1 | 7.2% |
| 1-BTB-6 | 14.5% |
| 4-BTB-4 | 7.3% |
| 3-HHB-1 | 2% |
| 1-BHH-3VFF | 2% |
| 1-BHH-1VF | 2% |
| 3-H2BTB-2 | 4% |
| 3-H2BTB-3 | 4% |
| 3-H2BTB-4 | 3% |
| 3-HB (F) TB-2 | 3% |
| 3-HHEBH-3 | 2% |

A transparent point of this liquid crystal composition was $T_{NI}=70.8$ (° C.), a viscosity at 20° C. was $\eta_{20}=16.3$ (mPa·s), a refractive anisotropy at 25° C. was $\Delta n=0.169$, a dielectric anisotropy at 20° C. was $\Delta\epsilon=5.6$, and a threshold voltage at 20° C. was Vth=2.03 (V).

1.09 parts by weight of a chiral compound CM-33 was added to 100 parts by weight of this liquid crystal composition to prepare a composition, which was then poured into a 240° STN cell having a thickness of d=5.0 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.13 (V), a voltage $V_{10}$ at a transmittance of 10%=2.44 (V) and a sharpness $V_{10}/V_{90}=1.146$.

As compared with compositions in Comparative Examples 1 and 2, the transparent point became high and the viscosity became low. Furthermore, the sharpness was more improved than the compositon in the Comparative Example 2.

EXAMPLE 23

A liquid crystal composition consisting of the following components was prepared:

| | |
|---|---|
| 3-HH-VFF | 9% |
| 5-HH-VFF | 11% |
| 3-HB-C | 9% |
| V2-HB-C | 15% |
| 1V2-HB-C | 14% |

-continued

| | |
|---|---|
| 2-BTB-01 | 9% |
| 3-HHB-1 | 4% |
| 1-BHH-1VFF | 2% |
| 1-BHH-2VFF | 2% |
| 3-HHB-01 | 3% |
| 3-HB (F) TB-2 | 5% |
| 3-HB (F) TB-3 | 5% |
| 3-H2BTB-2 | 3% |
| 3-H2BTB-3 | 3% |
| 3-H2BTB-4 | 4% |
| 3-HBBH-5 | 2% |

A transparent point of this liquid crystal composition was $T_{NI}$=90.9 (° C.), a viscosity at 20° C. was η20=15.7 (mPa·s), a refractive anisotropy at 25° C. was Δn=0.154, a dielectric anisotropy at 20° C. was Δε=6.0, and a threshold voltage at 20° C. was Vth=2.30 (V).

0.86 parts by weight of a chiral compound CM-33 was added to 100 parts by weight of this liquid crystal composition to prepare a composition, which was then poured into a 240° STN cell having a thickness of d=5.5 μm, and the cell was evaluated by means of an yellow mode.

A voltage-transmittance characteristic (V-T characteristic) was determined by a rectangular wave of 70 Hz, to obtain a voltage $V_{90}$ at a transmittance of 90%=2.47 (V), a voltage $V_{10}$ at a transmittance of 10%=2.55 (V) and a sharpness $V_{10}/V_{90}$=1.032.

As compared with compositions in Comparative Examples 1 and 2, the transparent point became high and the viscosity became low. Furthermore, the sharpness was more improved than the compositon in the Comparative Example 2.

Advantage of the Invention

As shown by Examples, a liquid crystal composition which satisfies various characteristics required for a STN display mode and also which is superior in a voltage-transmittance characteristic (a sharpness) necessary for corresponding particularly to coloring, as well as a liquid crystal composition with a low viscosity necessary for corresponding to a high-speed response can be proposed according to the invention.

We claim:

1. A liquid crystal composition comprising a first component which is at least one member selected from the group consisting of compounds expressed by the formulae (I-a) and (1-b)

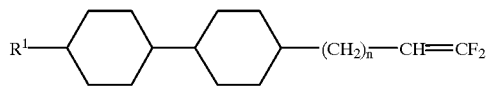
(I-a)

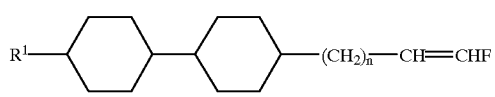
(I-b)

wherein $R^1$ denotes an alkyl group having from 1 to 10 carbon atoms wherein one $CH_2$ group may be replaced by oxygen atom or —CH=CH— group; and n denotes 0 to 20, a second component which is at least one member selected from the group consisting of compounds expressed by the formulae II-a, II-b, II-c and II-d

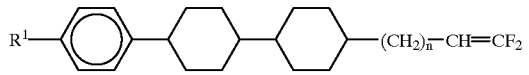
(II-a)

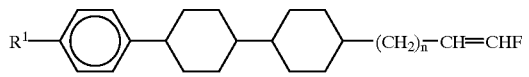
(II-b)

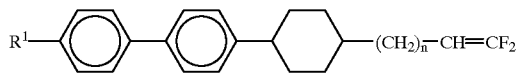
(II-c)

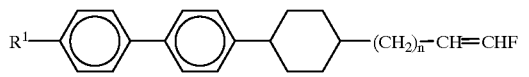
(II-d)

wherein $R^1$ denotes an alkyl group having from 1 to 10 carbon atoms wherein one $CH_2$ group may be replaced by oxygen atom or —CH=CH— group; and n denotes 0 to 20, and a third component which is at least one member selected from the group consisting of compounds expressed by the formulae III-a, III-b and III-c

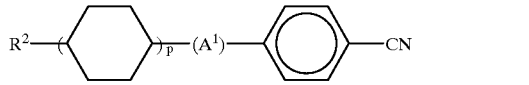
(III-a)

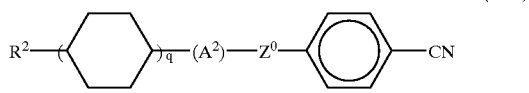
(III-b)

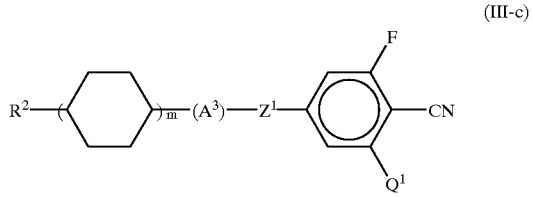
(III-c)

wherein $R^2$ denotes an alkyl group having from 1 to 10 carbon atoms wherein one $CH_2$ group may be replaced by oxygen atom or —CH=CH— group; $Z^0$ denotes —COO— or —CH$_2$CH$_2$—; $Z^1$ denotes —CH$_2$CH$_2$—, —COO— or a single bond; $Q^1$ denotes H or F; $A^1$ denotes trans-1,4-cyclohexylene, 1,4-phenylene or 1,3-dioxane-2,5-diyl; $A^2$ and $A^3$ each independently denote trans-1,4-cyclohexylene or 1,4-phenylene; and p, q and m each independently denote 0 or 1.

2. A liquid crystal composition according to claim 1, comprising the first component in an amount from 3 to 50% by weight, the second component in an amount from 3 to 40% by weight and the third component in an amount from 10 to 60% by weight, all based on the total weight of the composition.

3. A liquid crystal display element comprising a liquid crystal composition according to claim 1.

4. A liquid crystal display element comprising a liquid crystal composition according to claim 2.

5. A liquid crystal composition comprising a first component which is at least one member selected from the group consisting of compounds expressed by the formulae (I-a) and (I-b)

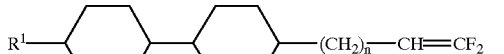
(I-a)

(I-b)

wherein $R^1$ denotes an alkyl group having from 1 to 10 carbon atoms wherein one $CH_2$ group may be replaced by oxygen atom or —CH=CH— group; and n denotes 0 to 20, a second component which is at least one member selected from the group consisting of compounds expressed by the formulae II-a, II-b, II-c and II-d

(II-a)

(II-b)

(II-c)

(II-d)

wherein $R^1$ denotes an alkyl group having from 1 to 10 carbon atoms wherein one $CH_2$ group may be replaced by oxygen atom or —CH=CH— group; and n denotes 0 to 20, a third component which is at least one member selected from the group consisting of compounds expressed by the formulae III-a, III-b and III-c

(III-a)

(III-b)

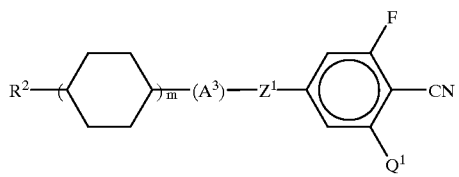
(III-c)

wherein $R^2$ denotes an alkyl group having from 1 to 10 carbon atoms wherein one $CH_2$ group may be replaced by oxygen atom or —CH=CH— group; $Z^0$ denotes —COO— or —$CH_2CH_2$—; $Z^1$ denotes —$CH_2CH_2$—, —COO— or a single bond; $Q^1$ denotes H or F; $A^1$ denotes trans-1,4-cyclohexylene, 1,4-phenylene or 1,3-dioxane-2,5-diyl; $A^2$ and $A^3$ each independently denote trans-1,4-cyclohexylene or 1,4-phenylene; and p, q and m each independently denote 0 or 1, and a fourth component which is at least one member selected from the group consisting of compounds expressed by the formulae IV, V, VI-a and VI-b $$R^3\text{-(B)-}Z^2\text{-(C)-}R^4 \quad (IV)$$

wherein $R^1$ and $R^4$ each independently denote an alkyl group having from 1 to 10 carbon atoms wherein one $CH_2$ group may be replaced by oxygen atom or —CH=CH— group; B denotes trans-1,4-cyclohexylene, pyrimidine-2,5-diyl or 1,4-phenylene; C denotes trans-1,4-cyclohexylene or 1,4-phenylene; and $Z^2$ denotes —C≡C—, —COO—, —$CH_2CH_2$—, —CH=CH—, —CF=CF— or a single bond, $$R^5\text{-(D)-}Z^3\text{-(E)-}Z^4\text{-(G)-}R^6 \quad (V)$$

wherein $R^5$ denotes an alkyl group having from 1 to 10 carbon atoms wherein one $CH_2$ group may be replaced by oxygen atom or —CH=CH— group; $R^6$ denotes an alkyl group, an alkoxy group or an alkoxymethyl group having from 1 to 10 carbon atoms; D denotes trans-1,4-cyclohexylene or pyrimidine-2,5-diyl; E denotes trans-1,4-cyclohexylene or 1,4-phenylene in which one H at a 2-, 3-, 5- or 6-position may be optionally replaced by F; G denotes trans-1,4-cyclohexylene or 1,4-phenylene; $Z^3$ denotes —$CH_2CH_2$ or a single bond; and $Z^4$ denotes —C≡C—, —COO—, —CH=CH— or a single bond,

(VI-a)

(VI-b)

wherein $R^7$ denotes an alkyl group having from 1 to 10 carbon atoms wherein one $CH_2$ group may be replaced by oxygen atom or —CH=CH— group; $R^8$ denotes an alkyl group, an alkoxy group or an alkoxymethyl group having from 1 to 10 carbon atoms; and $Q^2$ denotes H or F.

6. A liquid crystal composition according to claim 5, comprising the first component in an amount from 3 to 50% by weight, the second component in an amount from 3 to 40% by weight, the third component in an amount from 10 to 60% by weight, and the fourth component in an amount from 1 to 60% by weight, all based on the total weight of the composition.

7. A liquid crystal display element comprising a liquid crystal composition according to claim 5.

8. A liquid crystal display element comprising a liquid crystal composition according to claim 6.

9. A liquid crystal composition comprising a first component which is at least one member selected from the group consisting of compounds expressed by the formulae (I-a) and (I-b)

(I-a)

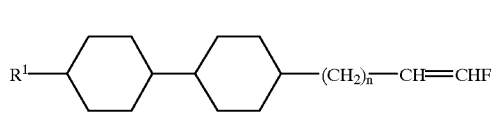
(I-b)

wherein $R^1$ denotes an alkyl group having from 1 to 10 carbon atoms wherein one $CH_2$ group may be replaced by oxygen atom or —CH=CH— group; and n denotes 0 to 20, a second component which is at least one member selected from the group consisting of compounds expressed by the formulae II-a, II-b, II-c and II-d

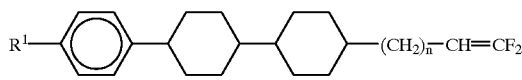
(II-a)

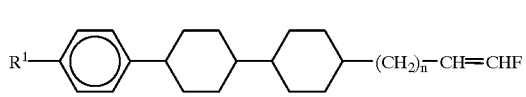
(II-b)

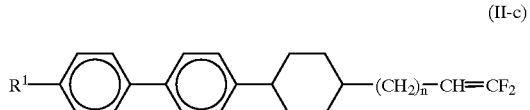
(II-c)

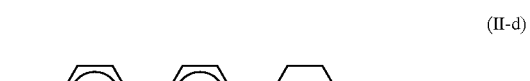
(II-d)

wherein $R^1$ denotes an alkyl group having from 1 to 10 carbon atoms wherein one $CH_2$ group may be replaced by oxygen atom or —CH=CH— group; and n denotes 0 to 20, a third component which is at least one member selected from the group consisting of compounds expressed by the formulae III-a, III-B and III-c

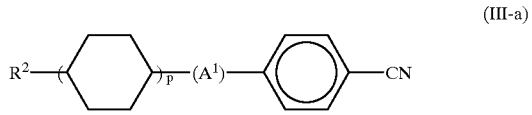
(III-a)

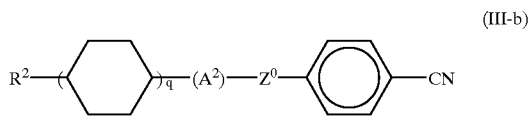
(III-b)

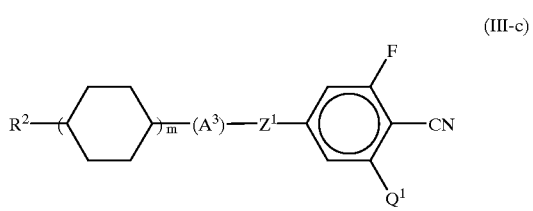
(III-c)

wherein $R^2$ denotes an alkyl group having from 1 to 10 carbon atoms wherein one $CH_2$ group may be replaced by oxygen atom or —CH=CH— group; $Z^0$ denotes —COO— or —$CH_2CH_2$—; $Z^1$ denotes —$CH_2CH_2$—, —COO— or a single bond; $Q^1$ denotes H or F; $A^1$ denotes trans-1,4-cyclohexylene, 1,4-phenylene or 1,3-dioxane-2,5-diyl; $A^2$ and $A^3$ each independently denote trans-1,4-cyclohexylene or 1,4-phenylene; and p, q and m each independently denote 0 or 1, a fourth component which is at least one member selected from the group consisting of compounds expressed by the formulae IV, V, VI-a and VI-b

$R^3$-(B)-$Z^2$-(C)-$R^4$ (IV)

wherein $R^3$ and $R^4$ each independently denote an alkyl group having from 1 to 10 carbon atoms wherein one $CH_2$ group may be replaced by oxygen atom or —CH=CH— group; B denotes trans-1,4-cyclohexylene, pyrimidine-2,5-diyl or 1,4-phenylene; C denotes trans-1,4-cyclohexylene or 1,4-phenylene; and $Z^2$ denotes —C≡C—, —COO—, —$CH_2CH_2$—, —CH=CH—, —CF=CF— or a single bond,

$R^5$-(D)-$Z^3$-(E)-$Z^4$-(G)-$R^6$ (V)

wherein $R^5$ denotes an alkyl group having from 1 to 10 carbon atoms wherein one $CH_2$ group may be replaced by oxygen atom or —CH=CH— group; $R^6$ denotes an alkyl group, an alkoxy group or an alkoxymethyl group having from 1 to 10 carbon atoms; D denotes trans-1,4-cyclohexylene or pyrimidine-2,5-diyl; E denotes trans-1,4-cyclohexylene or 1,4-phenylene in which one H at a 2-, 3-, 5- or 6-position may be optionally replaced by F; G denotes trans-1,4-cyclohexylene or 1,4-phenylene; $Z^3$ denotes —$CH_2CH_2$— or a single bond; and $Z^4$ denotes —C≡C—, —COO—, —CH=CH— or a single bond,

(VI-a)

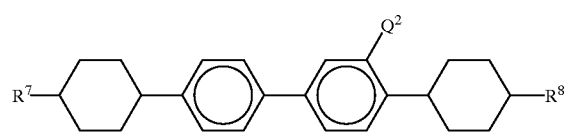

(VI-b)

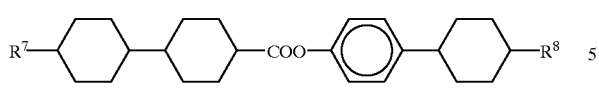

wherein $R^7$ denotes an alkyl group having from 1 to 10 carbon atoms wherein one $CH_2$ group may be replaced by oxygen atom or —CH=CH— group; $R^8$ denotes an alkyl group, an alkoxy group or an alkoxymethyl group having from 1 to 10 carbon atoms; and $Q^2$ denotes H or F, and a fifth component which is at least one member selected from the group consisting of compounds expressed by the formulae VII and VIII (VII)

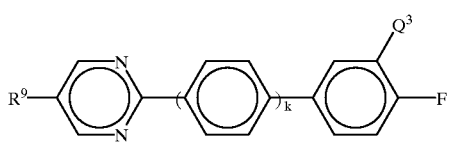

wherein $R^9$ denotes an alkyl group having from 1 to 10 carbon atoms; $Q^3$ denotes H or F: and k denotes 0 or 1, (VIII)

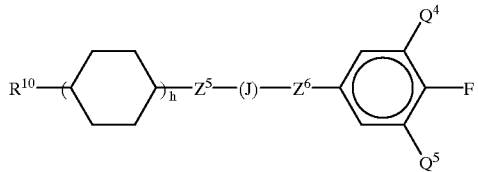

wherein $R^{10}$ denotes an alkyl group having from 1 to 10 carbon atoms; J denotes trans-1,4-cyclohexylene or 1,4-phenylene; $Q^4$ and $Q^5$ each independently denote H or F; $Z^5$ and $Z^6$ each independently denote —COO— or a single bond; and h denotes 0, 1 or 2.

10. A liquid crystal composition according to claim 9, comprising the first component in an amount from 3 to 50% by weight, the second component in an amount from 3 to 40% by weight, the third component in an amount from 10 to 60% by weight, the fourth component in an amount from 1 to 60% by weight, and the fifth component in an amount from 1 to 50% by weight, all based on the total weight of the composition.

11. A liquid crystal display element comprising a liquid crystal composition according to claim 9.

12. A liquid crystal display element comprising a liquid crystal composition according to claim 10.

\* \* \* \* \*

UNITED STATES PATENT AND TRADEMARK OFFICE
CERTIFICATE OF CORRECTION

PATENT NO. : 6,207,075 B1
DATED : March 27, 2001
INVENTOR(S) : Toshihiko Muraoka et al.

It is certified that error appears in the above-identified patent and that said Letters Patent is hereby corrected as shown below:

Column 22,
Table 1, under the heading "Left terminal group", change the asterisk (*) in the sixth group to -- = --.

Column 23,
Table 1, change the heading under 1 to
-- Ring Structure   Symbol   Right terminal group   Symbol   --;
Line 55, insert -- CM-33 -- on the line above the structural formula.

Column 25,
Line 3, change "72" to -- $\eta$ --;
Line 16, change "V10/V90" to -- $V_{10}/V_{90}$ --;
Line 50, change "dutyl/16" to -- duty 1/16 --.

Column 27,
Line 22, change "5-HH-VF" to -- 3-HH-VF --.

Column 28,
Line 55, change "66" to -- $\Delta$ --.

Column 30,
Line 64, change "2-HHB-G" to -- 2-HHB-C --.

Column 33,
The table in Example 14, after "V2-HB-C"
Change the percentage amount to -- 8% --; after "1V2-BEB (F,F) -C",
Change the percentage amount to -- 9% --; after "5-PyB-F",
Change the percentage amount to -- 8% --; after "3-HHB-F",
Change the percentage amount to -- 5% --; after "3-HHB-O1",
Change the percentage amount to -- 5% --; after "3-HHB-1",
Change the percentage amount to -- 8% --; after "3-HB (F) TB-2",
Change the percentage amount to -- 5% --; after "3-H2BTB-2",
Change the percentage amount to -- 4% --; after "3-H2BTB-3",
Change the percentage amount to -- 4% --;
Change "3-H2BTB-3" in the last line of the table to -- 3-H2BVB-3 --, and
Change the percentage value after this component to -- 4% --.

UNITED STATES PATENT AND TRADEMARK OFFICE
CERTIFICATE OF CORRECTION

PATENT NO. : 6,207,075 B1
DATED : March 27, 2001
INVENTOR(S) : Toshihiko Muraoka et al.

It is certified that error appears in the above-identified patent and that said Letters Patent is hereby corrected as shown below:

<u>Column 36,</u>
The table in Example 19, after "1-BBH-3VFF",
Change the percentage amount to -- 2% --; after "3-PyBB-F",
Change the percentage amount to -- 4% --;
Change "3-HB (F) TB-2" in the last line of the table to -- 3HB (F) VB-2 --;
Line 52, change "TNI" to -- $T_{NI}$ --;
Line 65, change "V90" to -- $V_{90}$ --;
Line 66, change "V10" to -- $V_{10}$ --;
Line 67, change "V10/V90" to -- $V_{10}/V_{90}$ --.

<u>Column 42,</u>
Line 27, change "$R^1$" to -- $R^3$ --;
Line 47, change "-CH$_2$CH$_2$" to -- -CH$_2$CH$_2$- --.

<u>Column 43,</u>
Line 67, change "III-B" to -- III-b --.

Signed and Sealed this

Eighteenth Day of June, 2002

Attest:

Attesting Officer

JAMES E. ROGAN
*Director of the United States Patent and Trademark Office*